(12) United States Patent
Kanno et al.

(10) Patent No.: US 6,302,226 B1
(45) Date of Patent: Oct. 16, 2001

(54) POWER ASSISTED VEHICLE

(75) Inventors: Nobuyuki Kanno; Atsushi Uchiyama, both of Iwata (JP)

(73) Assignee: Yamaha Hatsudoki Kabushiki Kaisha, Iwata (JP)

(*) Notice: Subject to any disclaimer, the term of this patent is extended or adjusted under 35 U.S.C. 154(b) by 0 days.

(21) Appl. No.: 08/948,392

(22) Filed: Oct. 10, 1997

Related U.S. Application Data

(63) Continuation of application No. 08/491,374, filed on Jun. 16, 1995, now abandoned.

(30) Foreign Application Priority Data

| Jun. 16, 1994 | (JP) | 6-134727 |
| Oct. 17, 1994 | (JP) | 6-250396 |
| Jun. 6, 1995 | (JP) | 7-139034 |

(51) Int. Cl.[7] ................................................ B62D 11/04
(52) U.S. Cl. ...................... 180/6.5; 180/65.8; 180/907
(58) Field of Search ........................ 180/6.5, 6.2, 65.5, 180/907, 65.8, 65.2; 280/42, 650

(56) References Cited

U.S. PATENT DOCUMENTS

| 4,037,676 | * | 7/1977 | Ruse | 180/6.5 |
| 4,125,169 | * | 11/1978 | Harris et al. | 180/6.5 |
| 4,323,133 | * | 4/1982 | Williams | 280/42 |
| 4,422,515 | * | 12/1983 | Loveless | 180/907 |
| 5,094,310 | * | 3/1992 | Richey et al. | 180/907 |
| 5,234,066 | | 8/1993 | Ahsing et al. | 180/6.5 |

FOREIGN PATENT DOCUMENTS 0569954   11/1993   (EP) .

* cited by examiner

*Primary Examiner*—Anne Marie Boehler
(74) *Attorney, Agent, or Firm*—Ernest A. Beutler

(57) ABSTRACT

A number of embodiments of power-assisted manually operated vehicles, specifically wheelchairs. An arrangement is providing for sensing the amount of manual force inputted and then providing a power assist related to that input force. Once the operator either decreases the input of the manual force or discontinues it, the power assist is maintained for a predetermined time period so as to provide further assist. The power assist is reduced either gradually or in steps and may be held constant for a time before or after the power reduction. This provides a more natural effect and still reduces the necessity for operator input. Separate controls are provided for each of the wheels and a helper assist is also provided.

31 Claims, 21 Drawing Sheets

POWER ASSISTED VEHICLE

CROSS REFERENCE TO RELATED APPLICATION

This application is a continuation of U.S. patent application Ser. No. 08/491,374, filed Jun. 16, 1995 abandoned.

BACKGROUND OF THE INVENTION

This invention relates to a power-assisted, manually operated vehicle and more particularly to an improved power-assisted wheelchair or the like.

Various types of vehicles are provided which are designed to be operated primarily by the manual force input by the operator. Such vehicles may take the form of bicycles, watercraft, and other forms of wheeled vehicles such as wheelchairs. Frequently, the manual power for these vehicles is either augmented or replaced by a form of prime mover such as an electric motor powered by a battery. There are many instances, however, where it is desirable to maintain the manual control for the vehicle and require the input of manual force before the power assist is applied.

For example, in wheelchairs, it has been proposed to provide an arrangement wherein an electric motor assist is provided and which generates a power assist that is dependent upon the manual force input by the rider. In this way, the rider still obtains exercise and self esteem while operating the vehicle but the power assist reduces the actual force which the operator need apply. However, these type of devices shut off the power assist as soon as the manual force is discontinued. Thus, the vehicle requires considerable manual force in spite of the power assist. In addition, the operation of the vehicle no longer resembles manual operation. That is, the manual feel is removed with this type of power assist.

It is, therefore, a principal object of this invention to provide an improved power-assist arrangement for a manually-operated vehicle wherein the manual feel is retained and the operator expenditure of energy can be substantially reduced.

It is a further object of this invention to provide a power-assisted vehicle wherein the feel of operation of the vehicle still resembles that of a manually-powered vehicle although the force input requirements from the operator are substantially reduced.

When the operator applies a manual force to the vehicle for its propulsion and a power assist is switched on in response to this manual force, the operator may receive a feeling that he is no longer in control of the vehicle. That is, if the power assist comes on too fast and is too great, then the operator may feel discomfort. In addition, if the power assist is shut off rapidly when the manual force is no longer applied, then the operation of the vehicle tends to less simulate that of a manually-powered vehicle and again operator discomfort may result.

It is, therefore, a still further object of this invention to provide an improved power-assist arrangement for a vehicle wherein the power assist is tailored so as to more closely resemble manually powered operation while still providing effective and substantial assist.

With power-assisted vehicles, particularly wheelchairs, it has been generally the practice to provide a single electric motor which drives both wheels of the wheel chair. Thus, the power-assist mode is different than the normal manual mode wherein the operator may maneuver the wheelchair by applying different inputs to the individuals wheels. With a single electric motor drive, this control may be lost.

It is, therefore, a still further object of this invention to provide an improved power-assist arrangement for a wheelchair wherein each wheel is independently controlled and powered.

As is well known, many wheelchairs are constructed in such a way so that they can be collapsed or folded for storage or transport. If electric motor power assist is provided and a separate assist is provided for each wheel, the construction may be such so as to make it more difficult to achieve compact folding of the vehicle.

That is, therefore, a still further object of this invention to provide an improved power-assisted wheelchair wherein the electric motor power arrangement is oriented in such a way as to permit folding into a compact configuration.

SUMMARY OF THE INVENTION

Certain aspects of this invention are adapted to be embodied in a power-assisted, manually-operated vehicle having a manually operator for receiving a manual force for propelling the vehicle. A primer mover is carried by the vehicle and is operative to provide a propulsion force for propelling the vehicle. A control operates the prime mover. Sensing means sense the application of a manual force to the manual operator and the control is effective to initiate operation of the prime mover upon the output of a signal of predetermined value from the sensing means.

In accordance with a first feature of the invention, the operation of the prime mover is continued for a time period after the manual force applied to the manual operator is reduced.

In accordance with a further feature of the invention, the operation of the prime mover is continued at the same amount as when the manual force was reduced for a time period.

In accordance with another feature of the invention, the effective operation of the prime mover is gradually reduced upon the reduction of the manual force application.

Another feature of the invention is adapted to be embodied in a power-assisted, manually-operated vehicle having a frame assembly rotatably journaling a pair of wheels on the opposite sides thereof. Means are provided with each wheel for the application of a manual force thereto. A pair of prime movers are carried by the vehicle and each is operative to provide a propulsion force a respective one of the wheels. Sensing means sense the application of manual force to the manual operator for each wheel. A control is effective to initiate operation of each prime mover upon the output of a signal of predetermined value from the sensing means associated with the respective wheel to provide a power assist therefore.

A yet further feature of the invention is adapted to be embodied in an electrically-powered, foldable wheelchair having a frame assembly made up of a pair of side frame members interconnected by a linkage assembly for movement of the side frame members from a spaced operative position and a closed position wherein the side frame members are juxtaposed to each other. Each of the side frame members journal a respective wheel for rotation about a respective wheel axis. The wheel axes are coextensive. A pair of electric motors each carried by a respective side frame member have respective output shafts rotatable about armature shaft axes parallel to the respective wheel axis and as coupled by a pair of transmissions to the respective wheel for driving the respective wheel. The armature shafts are parallel to but offset from each other so that the motors are disposed in side-by-side relationship when the frame assembly is folded into its closed position.

DETAILED DESCRIPTION OF THE PREFERRED EMBODIMENTS OF THE INVENTION

Figure 1:
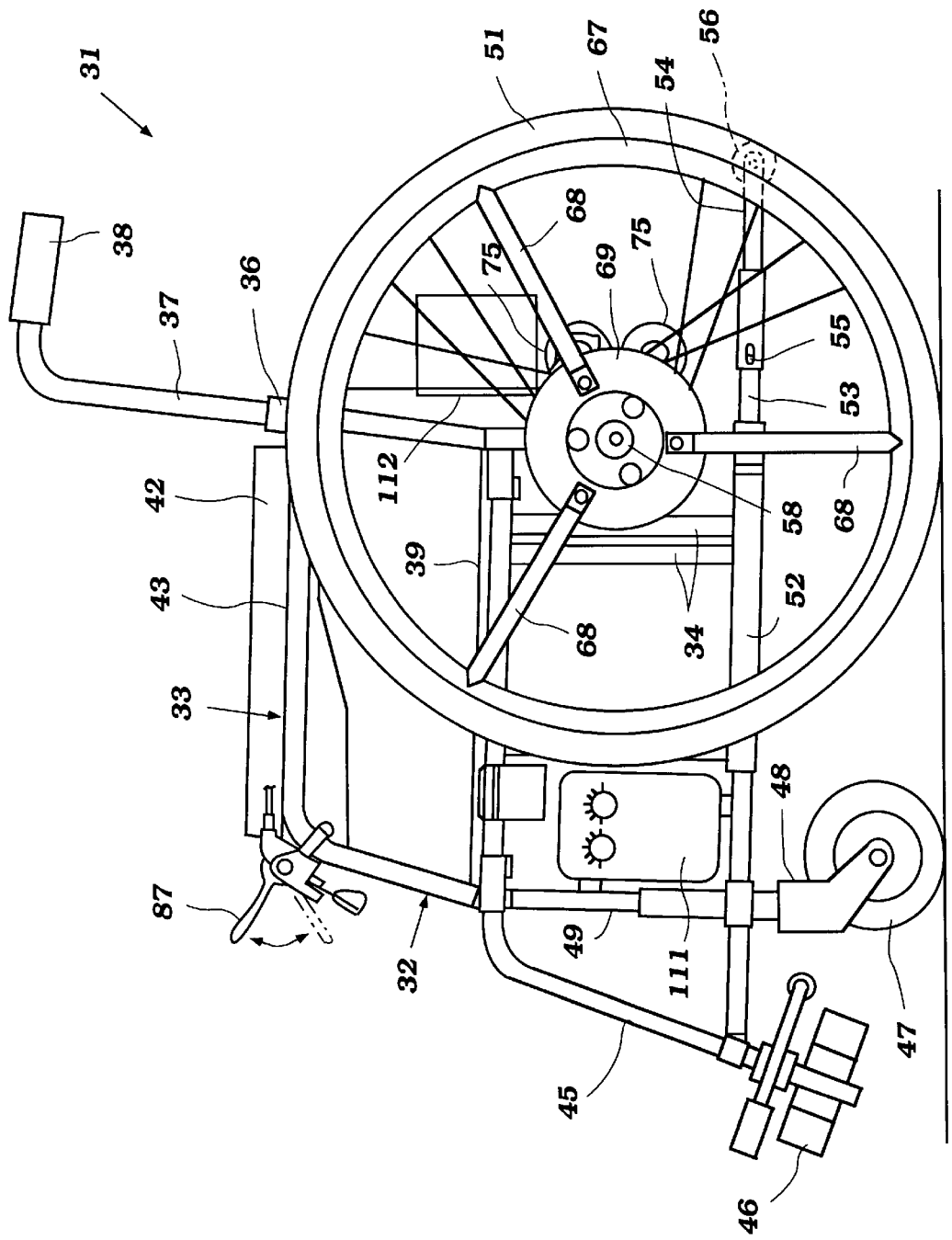
FIG. 1 is a side elevational view of a wheelchair constructed in accordance with an embodiment of the invention.
Figure 2:
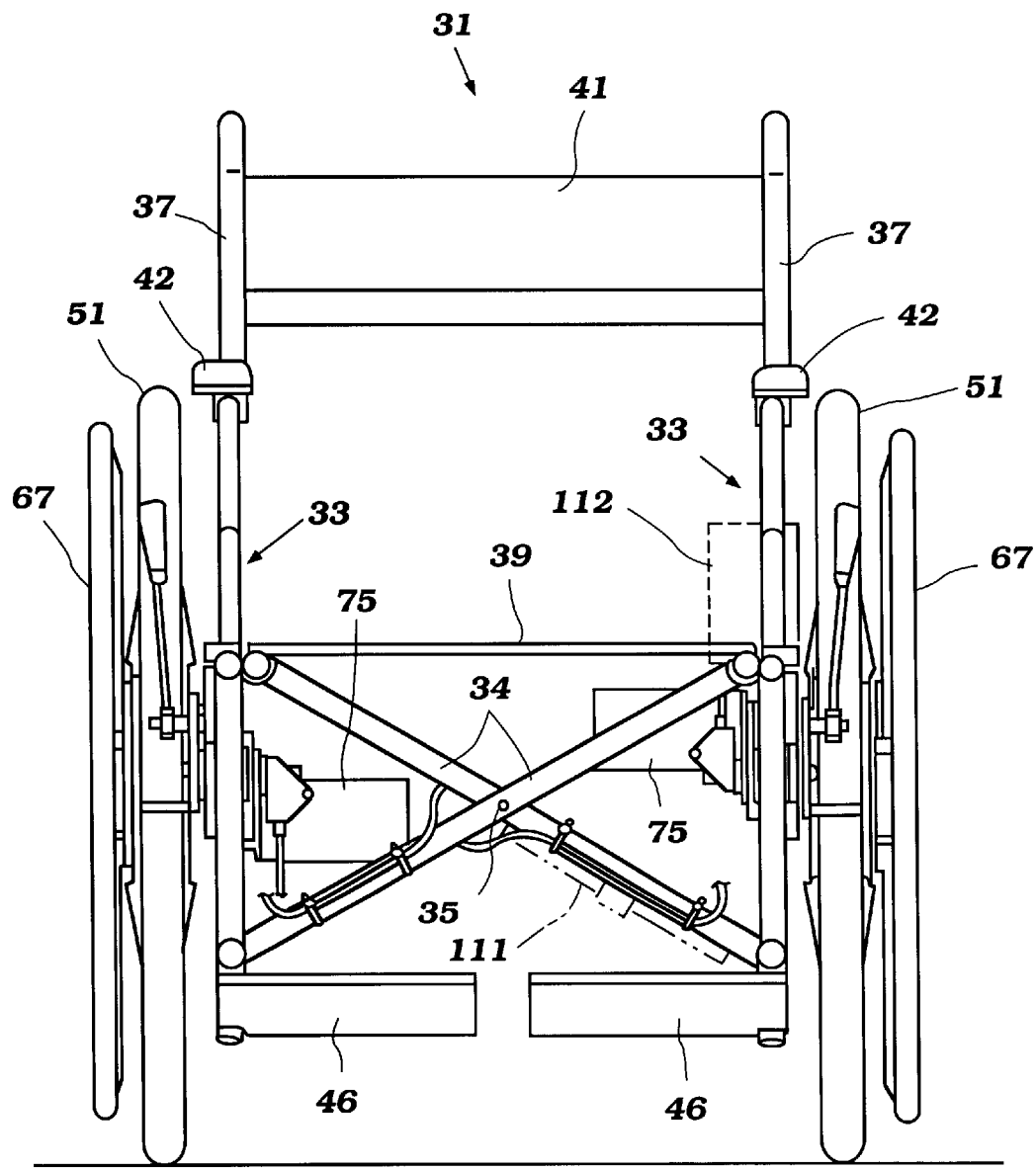
FIG. 2 is a front elevational view of the wheelchair shown in its normal, operative position.
Figure 3:
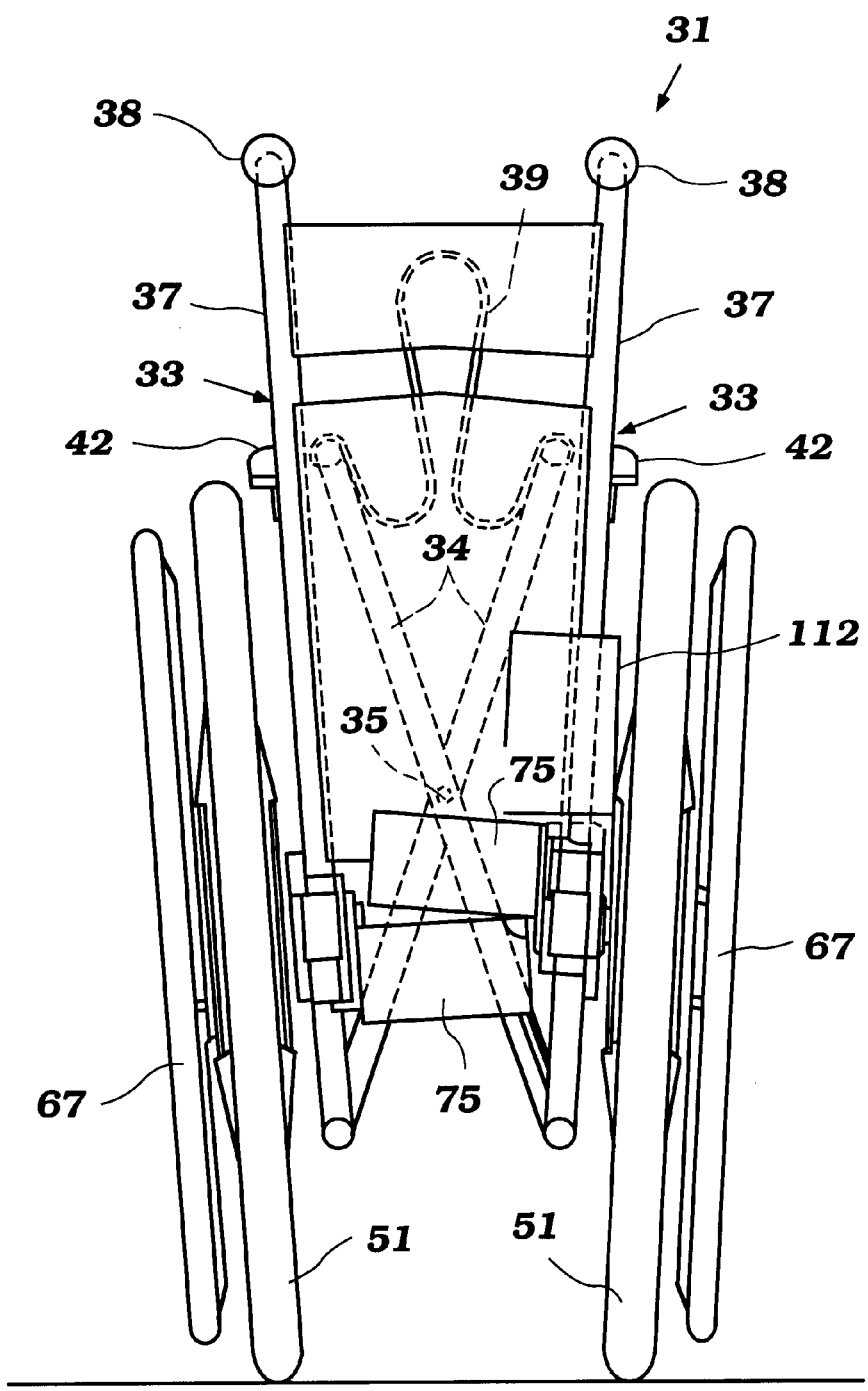
FIG. 3 is a rear elevational view, in part similar to FIG. 2, and shows the wheelchair folded to its storage or transportation position.

Referring now in detail to the drawings and initially to FIGS. 1–3, a foldable wheelchair constructed in accordance with an embodiment of the invention is identified generally by the reference numeral 31.

The foldable wheelchair 31 is comprised of a frame assembly, indicated generally by the reference numeral 32 which is comprised of a pair of tubular side frame members, each indicated by the reference numeral 33 and which have a generally h-shaped configuration in side elevation. These side frame members 33 are connected to each other by a scissors-type linkage system, comprised of a pair of links 34 pivotally connected to each other by a pivot pin 35. There is preferably a rear pair of links at the rear of the side frame members 33 and a front pair of links at the front of the side frame members 33.

The links 34 have pivotal connections at one of their ends to the side frame members 33 and sliding connections at their other ends to the side frame members 33 as is well known in this art. A suitable locking mechanism (not shown) may be provided for holding the side frame members 33 in their extended operative position as shown in FIG. 2 and/or in their retracted storage or transportation position as shown in FIG. 3.

Upstanding legs 36 of the side frame members 33 slidably support telescopic push handles 37 which carry handgrips 38 at their upper ends so that an assistant or helper may push the wheelchair 31.

A seat strap 39 and back strap 41 is connected at their ends to the side frame members 33 and handle portions 37, respectively, so as to accommodate a seated rider. These seat and back portions 39 and 41 are flexible so as to fold upon folding of the wheelchair 31 as clearly shown in FIG. 3.

Arm rests 42 are carried by horizontal parts of the side frame members 33 so as to support the occupant's arms. Foot rests 44 are connected to lower legs 45 of the side frame members 33 so as to accommodate the rider's feet. These foot rests also may be pivotal from their operative positions to storage positions, as is well known in this art.

A pair of front wheels 47 are connected by caster assemblies 48 to a further portion 49 of the side frame members 33 immediately to the rear of the foot rests 46. In addition, large rear wheels 49 are journaled by the side frame members 33, in a manner to be described, at the rear of the frame assembly and generally in line with the tubular portions 36.

The construction of the wheelchair 31 as thus far described may be considered to be conventional and as such forms no part of the invention, other than the environment in which the invention may be practiced. Therefore, where any component of the wheelchair 31 is not described in detail, any conventional construction may be utilized. Also, from the following description, those skilled in the art will readily understand how the invention may be applied not only to a wide variety of types of wheelchairs, but also that certain aspects may be applied to other types of manually-powered vehicles, both land and water.

Horizontally extending lower tubes 52 of the side frame assemblies 33 are provided with post extensions 53 on which extension tubes 54 are slidably supported. These extension tubes 54 are telescopic with their movement limited by a pin and slot arrangement 55. Wheels 56 are provided at the outer ends of the extensions 54 and can be employed to engage the ground so as to assist in manipulating the wheelchair 31 and to ensure that it will not be overturned. A coil compression spring (not shown) may be incorporated in the structure for urging the extension 54 and wheels 56 to their rearward positions.

The support and journal for the rear wheels 51 and the drive therefor will now be described by primary reference to FIGS. 4–10 with the initial description being directed primarily to FIGS. 4 and 5. The side frame members 33 carry, at their lower ends beneath the tubes 36, support tubes 57. Axles 58 are fixed within these support tubes 57 in a known manner and journal a hub 59 of each rear wheel 51 by means of spaced apart bearings 61 and 62. The hub 61 has an outer portion 63 to which a rim 64 is connected by a plurality of spokes 65. The rim 64 carries a rear tire 66 in a known manner.

In order to apply a manual force to operate the rear wheels 51, there is provided a hand wheel 67 which has a diameter which is only slightly less than that of the rim 64 or the same as it but less than the diameter of the tire 66. The hand rim 67 is connected by means of three spokes 68 to a center hub portion 69. The center hub portion 69 has threaded connections 71 to the inner ends of the spokes 68 and is journaled on the wheel hub 61 by bearings 72. In addition, a frictional drag brake 73 is interposed between the hand wheel hub 68 and the wheel hub 61 so as to provide a frictional connection therebetween.

As will become apparent, the hand wheel 67 is provided with a resilient lost motion connection to the respective rear wheel 51 so as to provide an arrangement wherein the manual force applied to power the wheel chair 31 may be measured. This construction will be described later by primary reference to FIGS. 6–10.

Figure 4:
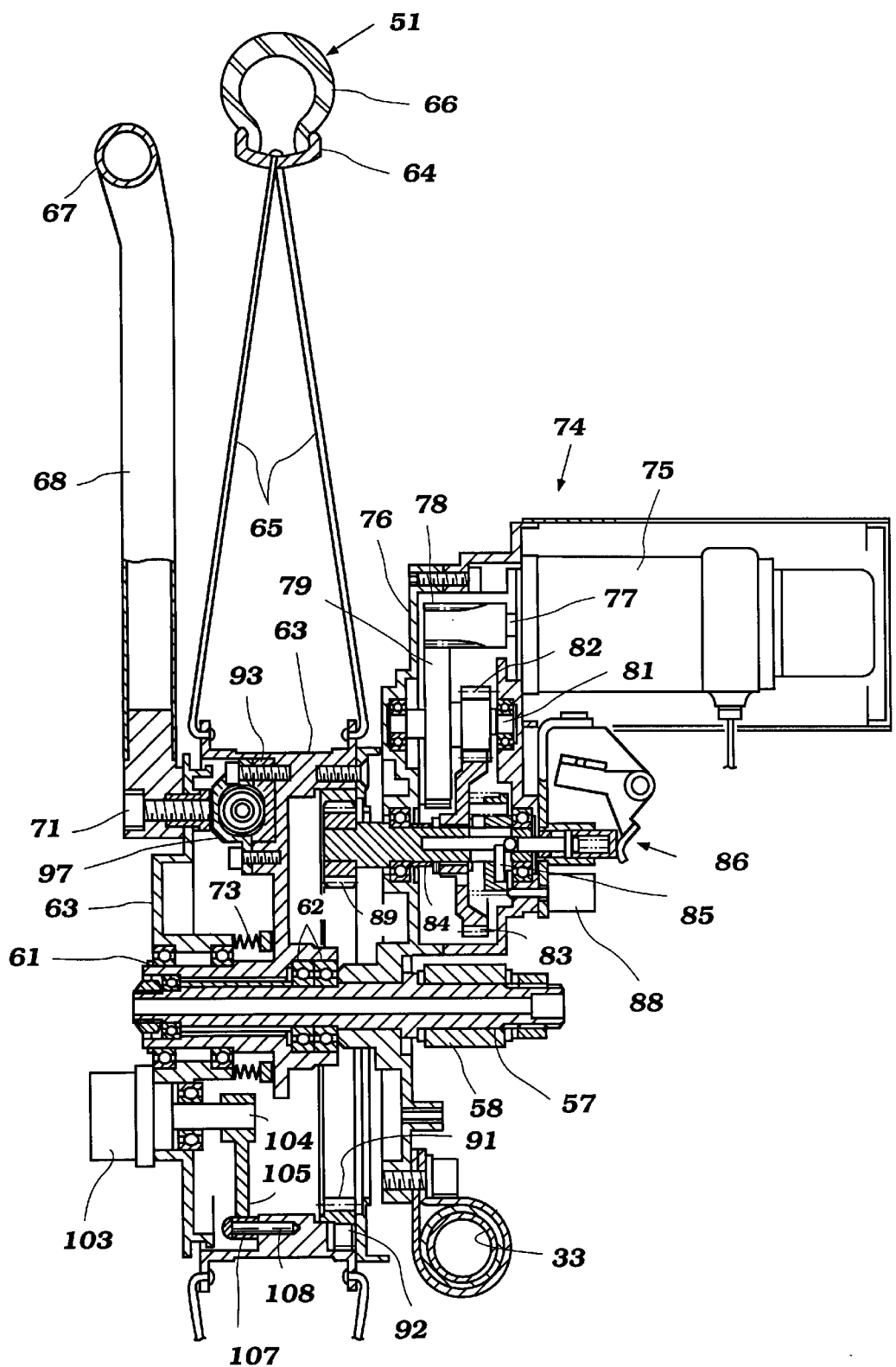
FIG. 4 is an enlarged cross-sectional view, looking in the same direction as FIGS. 3 and 4, and shows one of the wheels and the driving mechanism therefor.
Figure 5:
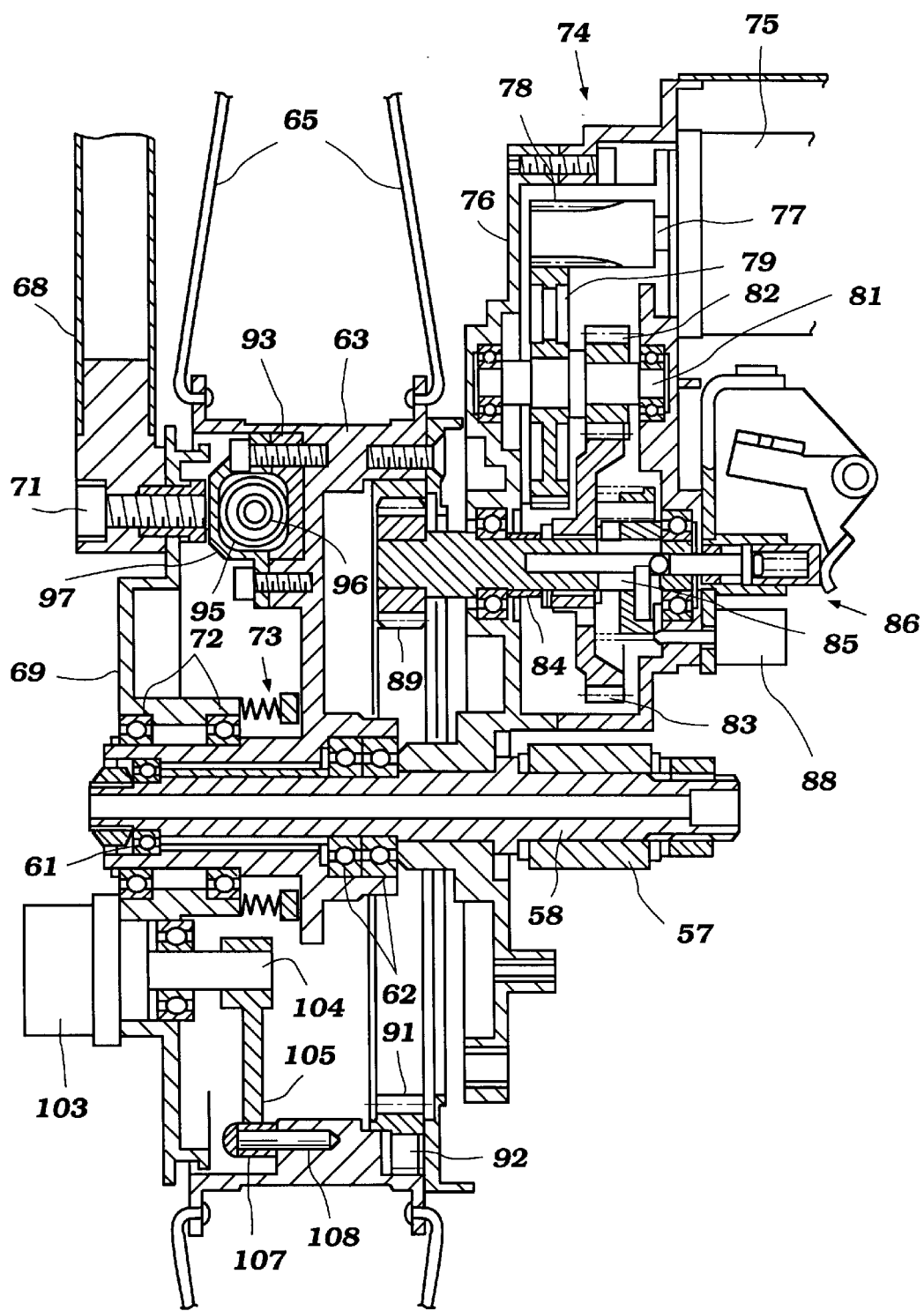
FIG. 5 is a further enlarged, cross-sectional view taken along the same plane as FIG. 4.
Figure 6:
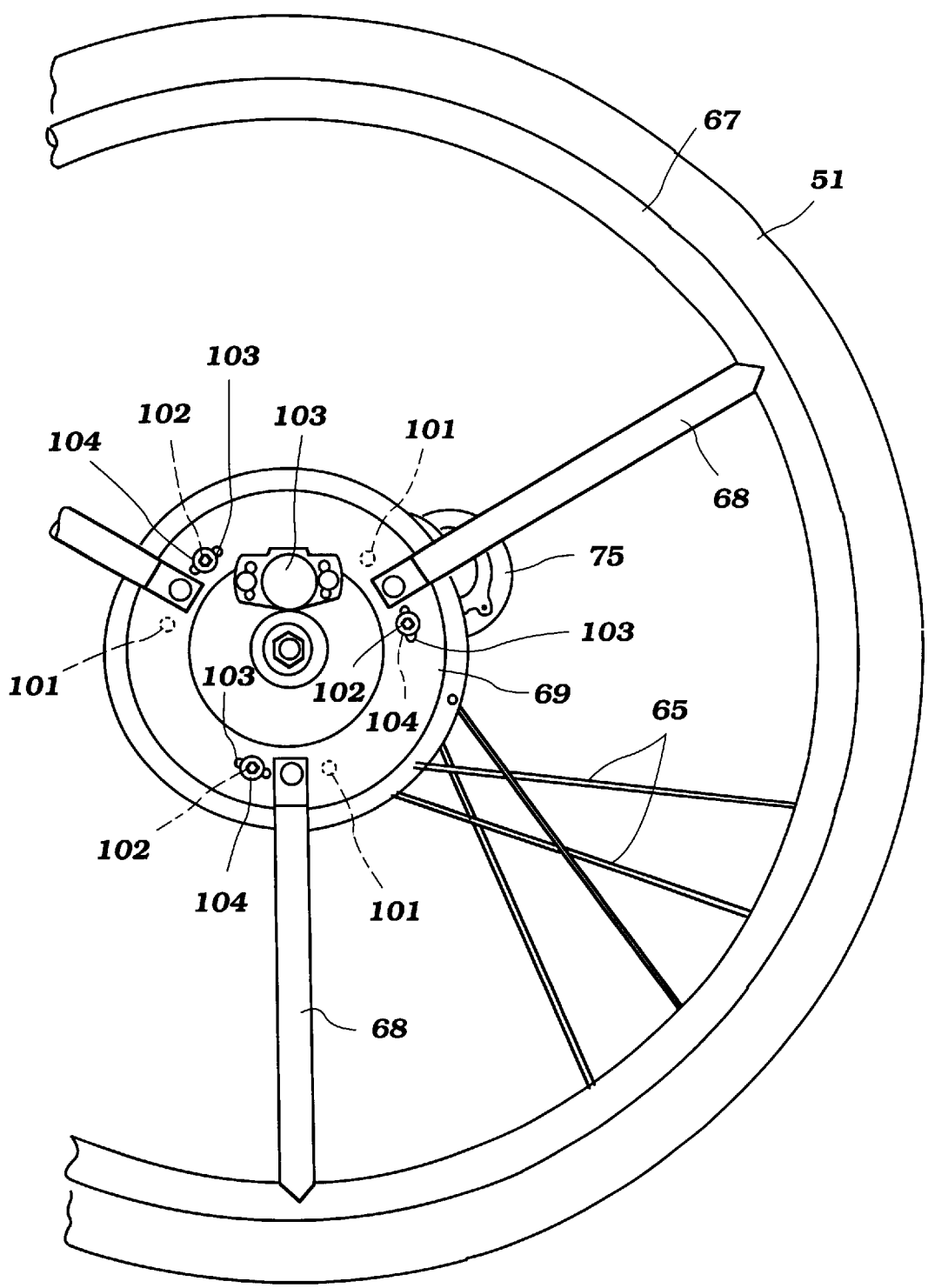
FIG. 6 is an enlarged, partial side elevational view of one of the driven wheels.
Figure 7:
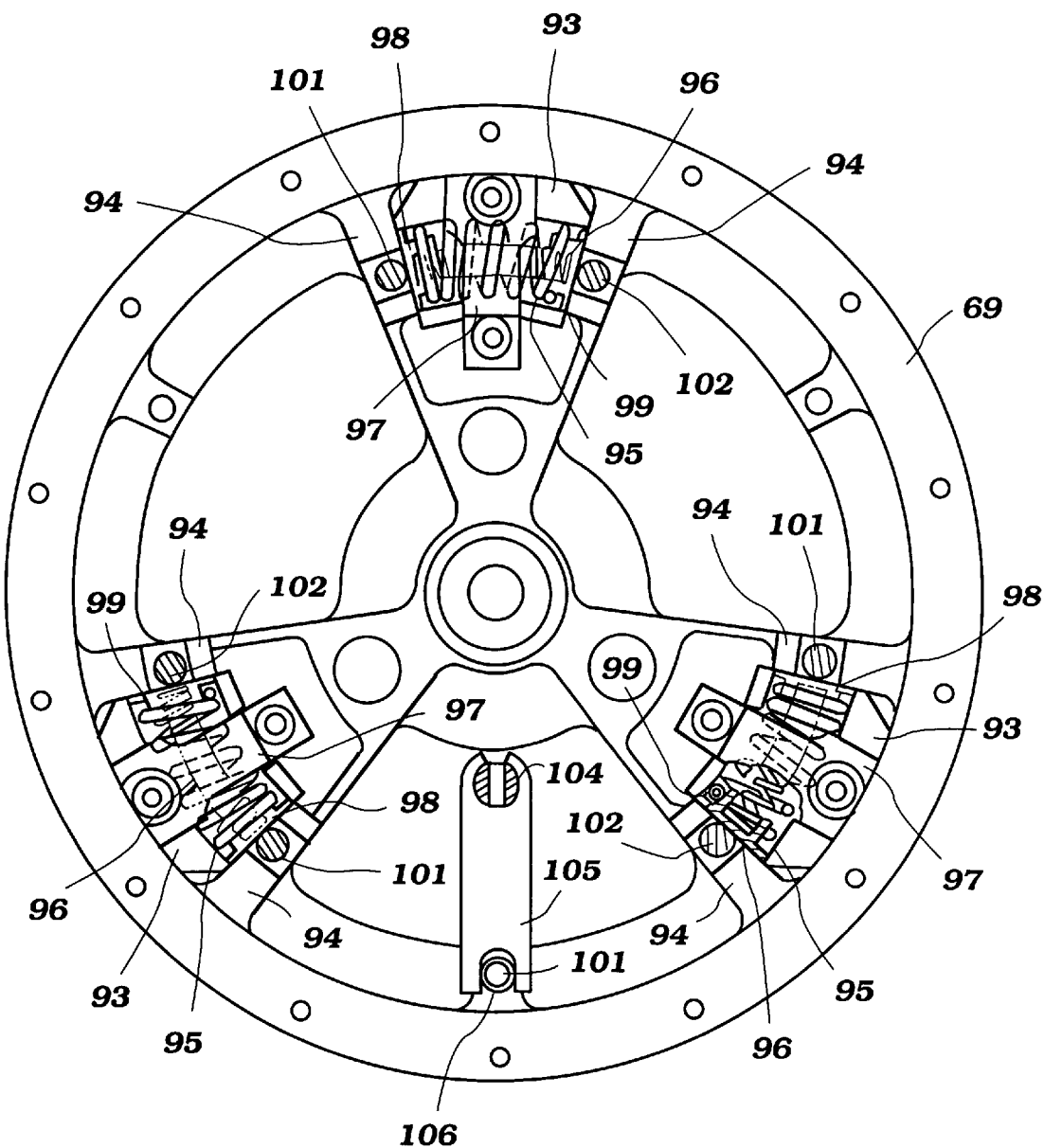
FIG. 7 is a cross-sectional view, looking in the direction opposite to FIG. 6 and shows the arrangement of the manual force sensing mechanism.

Continuing to refer primarily to FIGS. 4 and 5, the force sensed at the hand wheel 67 is utilized to control an electric motor or other prime mover assist mechanism, indicated generally by the reference numeral 74 for the respective wheel 51.

This prime mover assist is, in the illustrated embodiment, comprised of an electric motor 75 that is mounted on a mounting housing 76 which is connected suitably to each side frame member 33. The electric motor 75 associated with each rear wheel 51 has an armature shaft 77 that rotates about an axis that is parallel to but offset from the axis defined by the axle 58 and bearings 61 and 62. The offset is to the rear.

As may be best seen in FIG. 1, the motors 75 associated with each of the wheels is disposed so that its respective armature shaft 77 is parallel to each other but offset symmetrically to a horizontally extending plane containing the axis defined by the axle 58. Because of this staggered relationship, the motors 75 may extend inwardly toward the center of the frame assembly and nest relative to each other in side-by-side relationship as shown in FIG. 3 when the wheelchair 31 is folded to its storage or transport position. Hence, the arrangement can be maintained compact and the same drive arrangement may be employed at each side of the rear wheel so as to minimize the number of different parts which are employed while still achieving the aforenoted effect.

The mounting housing 76 defines a gear case in which a transmission is contained for transferring drive from the armature shaft 77 to the rear wheel 51. This transmission is a step down transmission comprised of a first relatively small diameter gear 78 that is affixed to the armature staff 77 and which is enmeshed with a larger diameter gear 79 of a compound gear set. This compound gear set is journaled on a shaft 81 mounted in the gear case 76. This compound gear includes a further smaller diameter gear section 82 that is integrally formed or rotatably connected to the larger diameter gear 79. The gear section 82 is enmeshed with a further larger diameter gear 83 which is journaled on a drive shaft 84.

A dog-type clutch 85 connects the gear 83 to the shaft 84. This dog-type clutch 85 is operated by an actuating lever 86 which is, in turn, operated by a clutch actuator 87 (FIG. 1) mounted on each side frame member 33 at the forward portion of the respective arm rest 42. The operator may move the clutch actuating lever 87 between an engaged and disengaged position so as to selectively engage or disengage the dog clutch 85 for power assist or no power assist at the operator's discretion.

A limit switch 88 (FIGS. 4 and 5) is positioned on the gear case 76 and senses when the dog clutch 85 is disengaged. When this condition exists, the electric motor 75 is disabled so that it cannot run when the clutch 85 is not engaged.

The drive shaft 84 has affixed to its inner end a pinion gear 89 which is engaged with a ring gear 91 carried by the hub 63 of the wheels 51 through resilient dampers 92. Hence, the transmission comprised of the gears 78, 79, 82, 83, 89 and 91 provide a large step down in speed from the motor armature 77 to the wheel 55 and power amplification.

The aforenoted connection between the hand wheel 67 and the respective rear wheel 51 will now be described by particular reference to FIGS. 6–10. As has been noted, this connection permits some relative rotation between the hand wheel 67 and the rear wheel 51. This relative rotation is resisted by a spring mechanism and the degree of relative rotation, as a result, provides an indication of the degree of force applied and this is utilized to control the amount of electric motor power assist.

It will be seen that the outer side of the wheel hub 63 adjacent the hand wheel rim 69 is provided with three circumferentially spaced spring retaining recesses 93. Each recess 93 is defined between a pair of spaced apart ribs 94. A compound spring assembly comprised of an outer, larger diameter, stiffer spring 95 and a smaller diameter, lighter rate spring 96 is provided in each space 93. The springs 95 and 96 are loosely retained in this area by spring retainers 97 that are affixed to the wheel hub 63 in a known manner.

A pair of spring cup retainers 98 and 99 are provided each of which has an inner diameter bore in which the ends of the inner spring 96 are trapped. Flange portions on the outer ends of the spring retainers 99 are normally spaced apart from the ends of the outer spring 95 as may be clearly seen in FIG. 9.

A first series of pins 101 are affixed in circumferentially spaced relations to the hand wheel hub 69 and are juxtaposed to the spring retainers 98. A second series of pins 102 are supported within slots 103 (FIG. 6) of the hand wheel hub 69 and are locked in place by retainer nuts 104. This arrangement permits adjustment in the distance between the pins 101 and 102 and the initial preload on the inner spring 96. Also, this adjustment adjusts the amount of compression of the inner spring 96 that must occur before the outer spring 95 is loaded. The pins 101 and 102 pass through slots 100 in the ribs 94.

Figure 9:
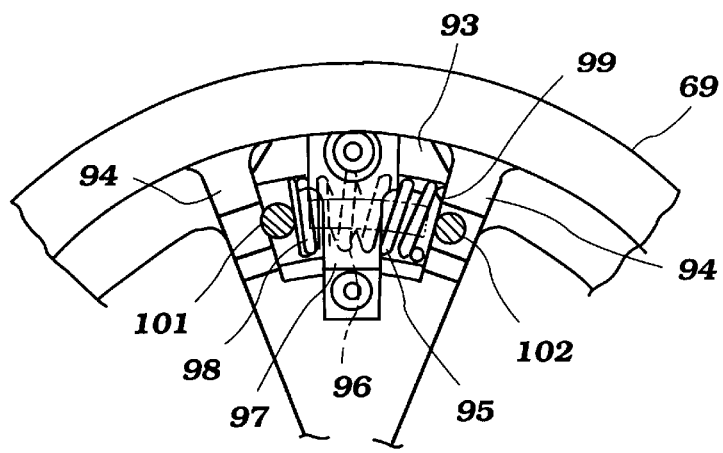
FIGS. 9 and 10 are views, in part similar to FIG. 7, showing the relative movement upon the application of a manual force to power the vehicle.
Figure 10:
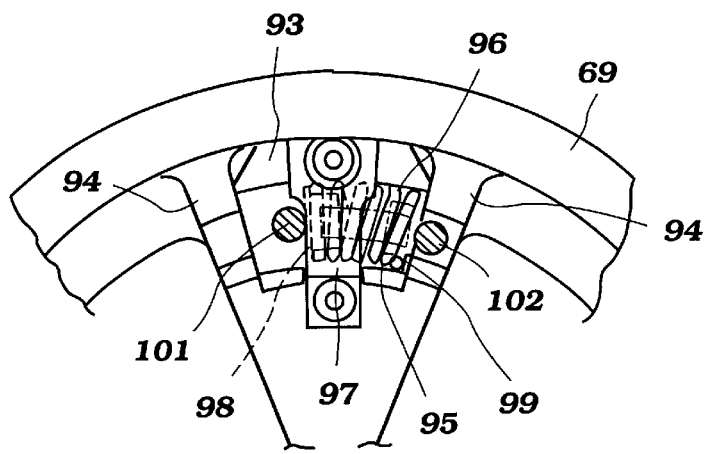

As will be described later, this arrangement permits adjustment in the assist ratio. That is, during initial rotation in one direction, as shown in FIG. 9, the pin 101 will compress the inner spring 96 with the other end being held in a fixed position by engagement with the rib 94 until the retainers 98 and 99 engage the ends of the spring 95. At this time, more force must be applied so as to achieve further movement. Eventually, the pins 101 and 102 will engage the spring retainer 97 and then there will be no further relative rotation between the hand wheel hub 69 and the rear wheel hubs 63 as shown in FIG. 10. The effect of this will be described later by reference to FIG. 12 and also to FIG. 13.

The same effect will be obtained in the opposite direction. That is, the pin 102 will move the spring retainer 99 to compress first the inner spring 96 and then the outer spring 95 until the system bottoms out.

This relative rotation is measured by a potentiometer, indicated generally by the reference numeral 103 (FIGS. 4 and 5) which is mounted on the hand wheel hub 69 and which has a potentiometer shaft 104. A lever arm 105 is affixed to the potentiometer shaft 104 and has a slotted end 106 in which a pin 107 extends. The pin 107 is fixed at 108 to the rear wheel hub 63. Accordingly, relative rotation between the hand wheel 67 and rear wheel 51 will effect pivotal movement of the potentiometer shaft 104 in one direction or another depending upon which way the operator is attempting to return the rear wheel 51. This signal is employed in a manner which will be described shortly by reference to FIGS. 11–14 so as to control the force applied by the electric motor 75 in assisting to drive the associate rear wheel 51.

It has been noted that there are handgrips 38 provided on each side of the frame assembly 32 for a helper pushing the wheelchair 31. Each of these handgrips 38 is connected to its supporting frame extension 37 through a spring-biased lost motion connection which may be similar to that employed between the hand wheel 67 and the rear wheel 51 and which operates a potentiometer, as shown schematically at 109 in FIG. 11.

Figure 11:
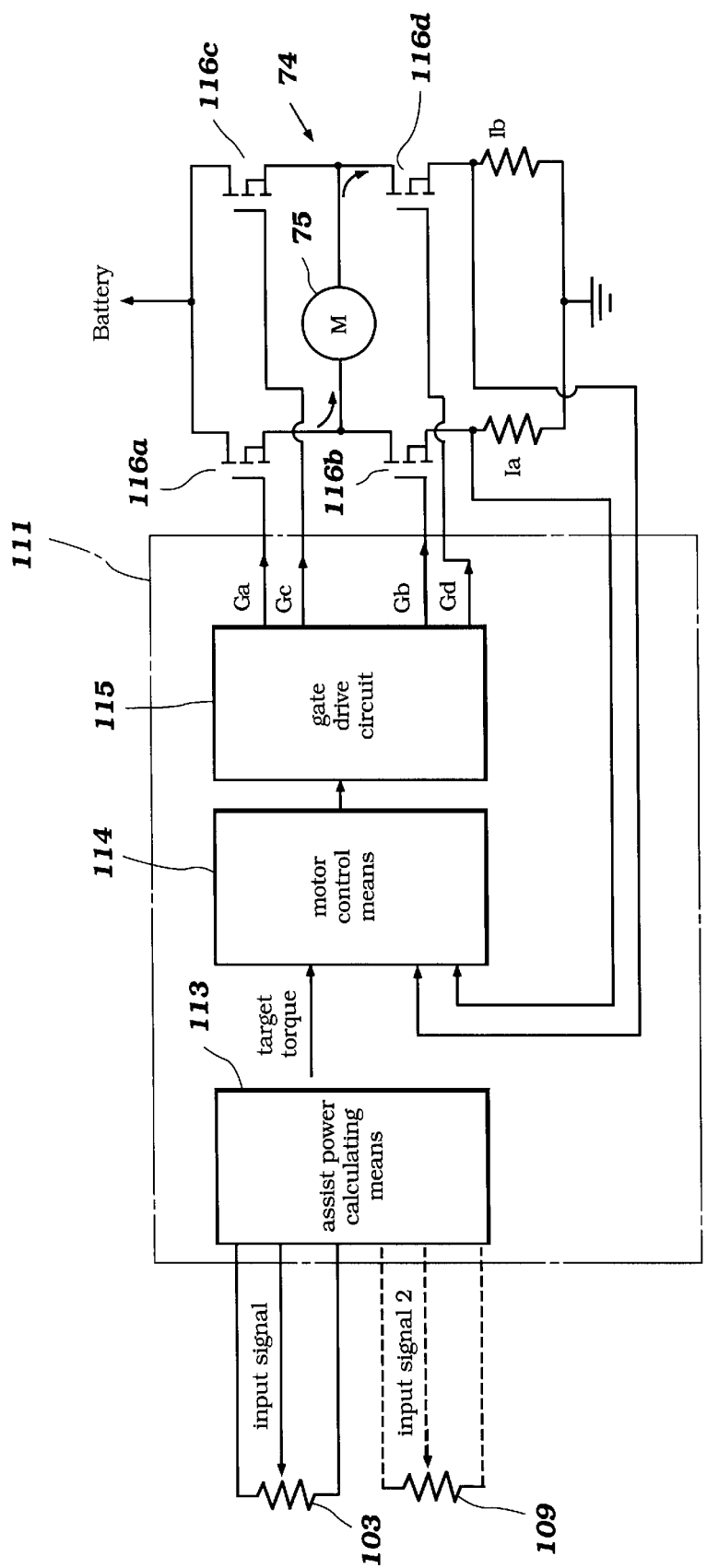
FIG. 11 is a partially schematic electrical diagram showing the components of the power-assist system.

That is, at each side of the wheelchair 31, each handgrip 38 has a respective potentiometer 109 which has an input signal which may also be inputted to a controller, indicated generally by the reference numeral 111 which also receives the signal from the respective rear wheel potentiometer 103. There is a controller 111 associated with each rear wheel 51 and its respective potentiometer 103 for the hand wheel assist and the potentiometer 109 for the helper assist. These controllers Ill are mounted suitably on the frame assembly 31, for example, on a portion of the scissors linkage system comprised of the links 34 as best shown in FIG. 2 although only one system actually appears, that associated with the left-hand wheel. Obviously, the construction shown in FIG. 11 is duplicated at each side for each rear wheel 51.

In addition, an electric storage battery 112, which may be rechargeable of any known type as carried by the frame assembly 32 at each side 33 thereof and adjacent the respective powered wheel. Alternatively to providing a separate battery 112 for each rear wheel, a battery pack may be provided that supplies power to each assist system, including the electric motor assist 74 and its motor 75 for each wheel. These assist mechanisms may each be of the type shown in FIG. 11 and will now be described by particular reference to that figure.

Each controller 111 includes an assist-power calculating section 113 that receives the input signals from the hand wheel operated potentiometer 103 and/or the hand grip potentiometer 109. The assist power calculating section determines a target assist torque, in a manner which will be described by reference to FIGS. 12–14, and outputs a signal to a motor control, shown schematically at 114. The motor control receives the target torque value from the assist-power calculator 113 and also the actual torque signals across the circuit of the electric motor 75 indicated at $I_b$ and $I_a$, in a manner to be described.

This then outputs a signal to a gate drive circuit 115 that outputs control signals for setting the duty ratio of the power assist to FETs (field effect transistors) 116a, b, c, and d for controlling the operation in forward or reverse directions by outputting date signals $G_a$, $G_b$, $G_c$ and $G_d$. Hence, the FETs will be turned on or off when the gate signals are applied and the power assist control in accordance with the routine which will be described now by particular reference to FIGS. 12–14.

Figure 12:
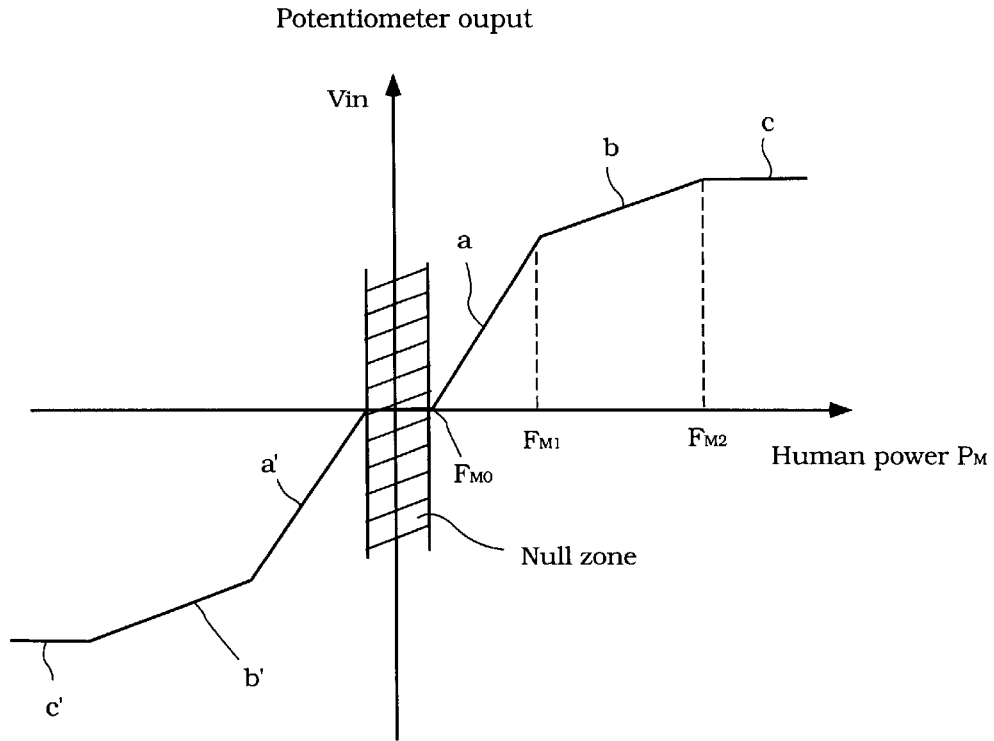
FIG. 12 is a graphical view showing the output signal of the force sensor in response to the application of manual force in both the forward and reversing directions.

Referring first to FIG. 12, this is a graphical view showing how the force applied by the operator $F_M$ varies during a normal operational cycle when applying either a force in the forward direction as shown at the right-hand side of this figure or in the reverse direction as shown in the left-hand side. In either event and as previously noted, there will be no relative rotation of the hand wheel 67 relative to the rear wheel 51 until sufficient force is exerted by the operator to overcome the initial preload force of the smaller inner springs 96.

Figure 8:
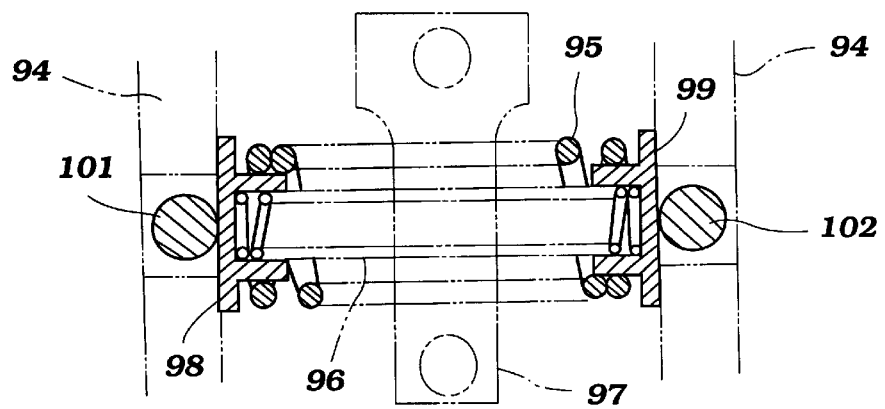
FIG. 8 is an enlarged cross-sectional view showing the spring arrangement and its loading mechanism in the connection between the hand wheel and the vehicle wheel.

As noted by previous description referring to FIGS. 8–10, when operating in the forward direction the pin 101 will load the spring 96 while when operating in rearward direction the pin 102 will load this spring. This initial force application will provide no output of the potentiometer and hence there will be a null zone, indicated by the shaded line in FIG. 12, where there is no potentiometer output. The width of this zone will be determined by the preload on the spring 96 which is adjusted, as previously noted, by changing the location of the pin 102 in its slot.

After this initial force is applied, indicated as $F_{mo}$, then the spring 96 will be compressed and relative rotation will occur along the portion of the curve indicated at a up until the force $F_{m1}$ is exerted. This will be the time when the clearance between the retainers 98 and 99 and the ends of the outer, larger spring 95 is taken up. Thereafter, the operator's force will provide a reduced degree of relative rotation for a given force due to the greater spring rate and hence less increase in potentiometer output will occur during the portion of the curve indicated at b until the force $F_{m2}$ is applied by the operator. This is the force necessary to bring both the pins 101 and 102 into contact with spring retainer 97 at which time no further relative rotation will occur during the increase in force input indicated by the curve portion c.

Thus, it should be readily apparent that the desired assist-ratio conditions can be set by changing the initial preload of the spring 96 and the rates of the springs 96 and 95 and the initial clearances between the ends of the retainers 98 and 99 and the ends of the spring 95.

It should also be noted that: because of the fact that the potentiometer 103 is operated through a leverage system, the degree of relative movement will be multiplied and this coupled with the lower spring rate of the inner spring provides good sensitivity and permits delicate operation of the wheelchair even with power assist. Also, it should be seen from FIG. 12 that the same general force and conditions are applied in the reverse direction.

The provision of the null zone in which there is no relative rotation also assists in detecting the stationary state of the wheelchair in the application of no force to compensate for mechanical and electrical errors.

Figure 13:
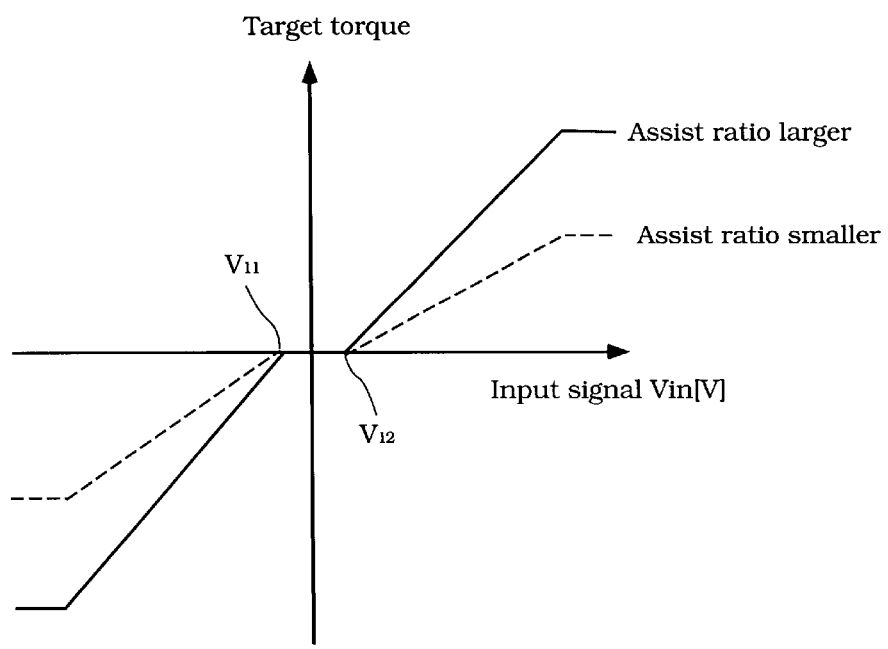
FIG. 13 is a graphical view showing the relationship of the input signal of the manual force transducer to the output signal of the power assist and shows the effect of varying assist ratios.

As may be seen in FIG. 13, the target torque setter, indicated by the reference numeral 113 in FIG. 11 can be designed so as to have the desired slope as to provide either a smaller or larger assist ratio as shown by the phantom and solid line views of FIG. 13 after the null period in the range of $V_{i1}$ to $V_{i2}$ is exceeded. As previously noted, this provides an assist ratio by controlling the duty cycle of the motor 75 and, accordingly, the assist ratio. As has been described and as may be seen in FIG. 11, in addition to the output from the potentiometer 103 of the hand wheel, the handgrip potentiometer 109 also outputs a signal indicative of manual force. The amount of power assist may be determined by either the input signal that is largest of the two potentiometers 103 and 109, the sum of the them or preference to the potentiometer 103 or the potentiometer 109, as may be desired.

In accordance with an important feature of the invention, the controller 111 operates so as to not only maintain a power assist when the operator is applying a manual force to propel the wheelchair 31 but also to continue to the power assist after the manual force is either discontinued or decreased. By providing this additional assist, the operator need not apply a force as frequently to the wheelchair 31 so as to cause its operation. Thus, although the manual feel of the wheelchair is maintained, the actual force input to create a given degree of travel can be reduced.

Figure 14:
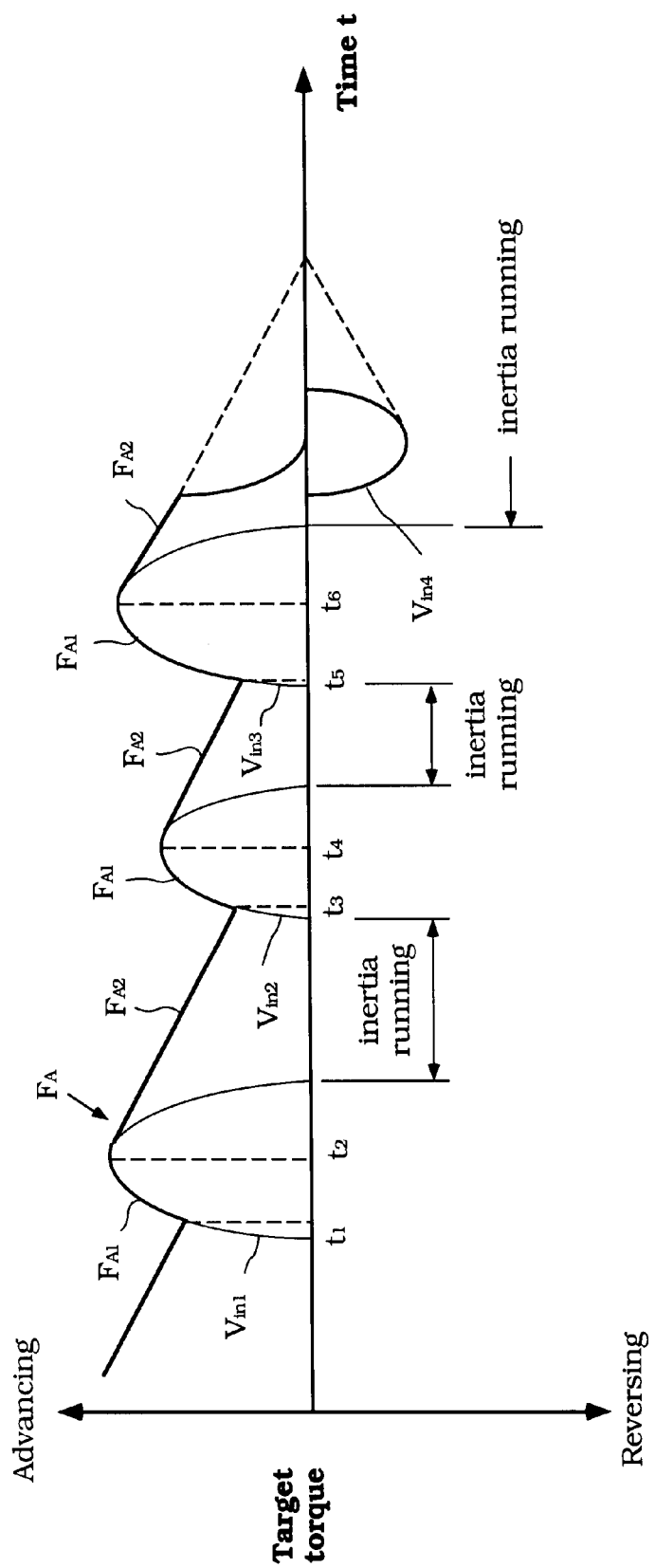
FIG. 14 is a time diagram showing the torque applied during several cycles of operation, including stopping, in accordance with an embodiment of the invention.

FIG. 14 is a graphical view showing how the assist power $F_A$ is maintained even after the human power input $F_m$ is either reduced or discontinued. Referring specifically to FIG. 14 and beginning at the time period $t_1$, when the potentiometer outputs a signal $V_{in1}$ then the controller 115 will generate a force assist $F_{A1}$ related to the manual input force. As may be seen, the curve $V_{in1}$ is a half-wave sinusoidal curve which represents the actual way in which an operator inputs a manual force to the hand wheel 67.

As may be seen from this curve, if assist $F_a$ was followed exactly the manual input or the output from the potentiometer $V_{in1}$ then at a given time after the time period t2 when the maximum manual force is input the power assist would stop. However, in accordance with this embodiment, the power assist $F_A$ is maintained but at a decreasing or decaying ratio once the output from the potentiometer $V_{in1}$ falls off. This outputs a force assist $F_{A2}$ which gradually declines with time in a manner which will be described. Thus, the power assist continues but gradually falls off so that the actual performance of the wheelchair 31 will follow that of a naturally operated cue. However, the inertia running is extended over that of manual power because of the added power assist and thus the human power can be reduced because the pitch or frequency with which the rider need apply power can be reduced.

As may be seen in this figure, this condition exists regardless of the degree of manual power placed into the system. However, if the operator decides he wishes to stop the wheelchair and exerts a negative force $V_{in4}$ then the actual power assist is dropped off in accordance with a negative curve as shown in this figure and the power assist will be rapidly decreased. This is because, the power assist is a sum of the manual power called for and that in accordance with the program and hence the inertia running state of the wheelchair is canceled and the wheelchair is rapidly brought to a stop.

As may be seen in FIG. 14, each time the operator again applies a manual force $F_a$ to the hand wheel, the assist force is not changed until the manual force as sensed by the output of the potentiometer equals that decayed value. Hence, on the next manual force application $V_{in2}$, power assist is not increased until the time t3 when the output from the potentiometer exceeds the actual assist force $F_{a2}$ called for from the previous force application. However, upon each subsequent application of manual force, the actual assist force $F_A$ which is decreased is changed from the previous maximum as also shown in FIG. 14. Where the inverse force is applied, then the actual assist is immediately decreased because of the fact that there is a summing of the forces as shown at the right-hand side of FIG. 14.

The actual decay curve can be set determining on the physical strength of the wheelchair user or may be changed in response to other variables. Also, the assist on reverse operation may be at a different rate and decay at a different rate than in the forward direction.

Figure 15:
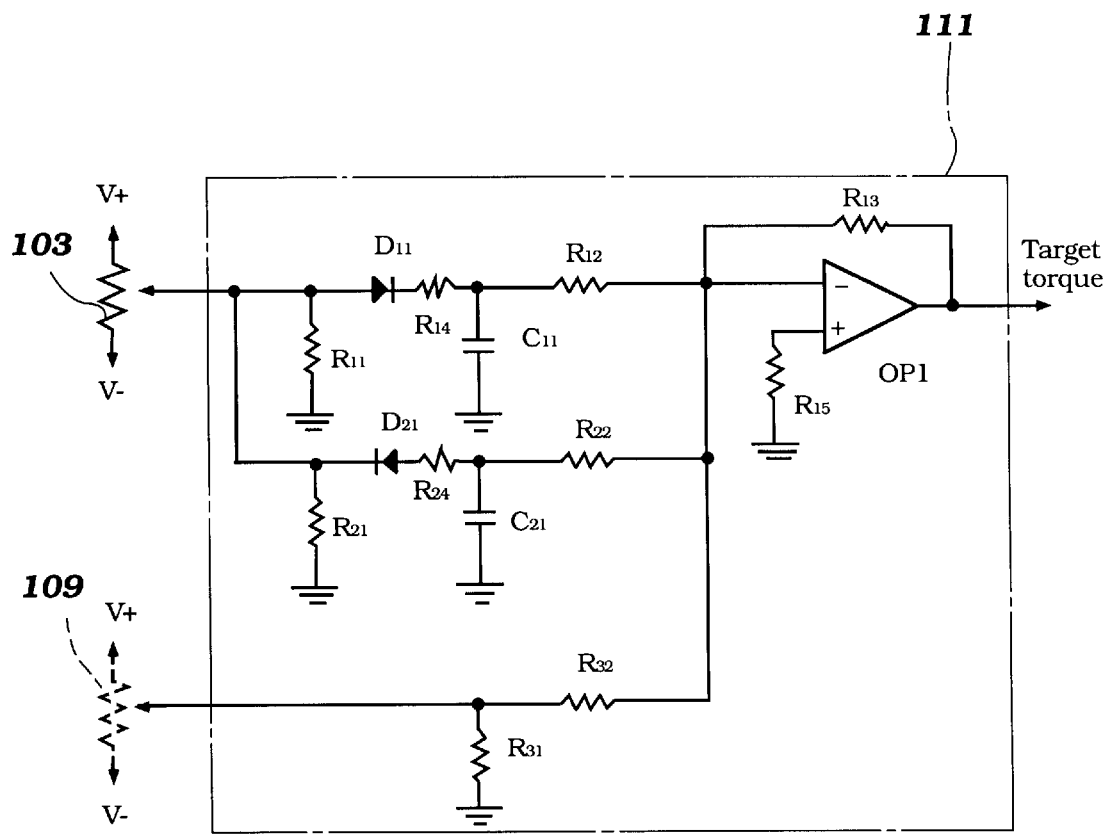
FIG. 15 is a circuit diagram showing the target power-assist calculating arrangement.

FIG. 15 shows an actual electrical circuit that can be utilized to provide this effect. Again, the potentiometer input from the wheel grip potentiometer 103 and helper potentiometer 109 are shown. Potentiometers 103 and 109 are connected to the positive and negative terminals of stabilized power sources and mechanically installed so that the output potential is zero when the input of human power Fm is zero. In this figure, the capacitors are indicated by the symbols C, diodes by the symbol D, resistors by the symbols R, and an operational amplifier or reverse adder indicated at OP1. The circuit illustrated provides that the output torque will be the sum of the outputs from the handle grip potentiometer 109 and the hand wheel potentiometer 103 and only decaying power assist is maintained from the hand wheel operated potentiometer 103. That is, as soon as a helper discontinues a pushing force on the hand grips 38, the target torque from this portion of the circuit will drop immediately to zero.

The capacitor C11 can also cause a voltage drop through the resistor R12 on the adder OP1. Thus, so long as the manual power is increasing, the capacitor C11 will continue to be charged so long as the human power $F_m$ is constant or increasing. However, the minute the potential of the potentiometer 103 starts to drop owing to a decrease of the human power $F_m$ inverse current is prevented by the action of the diode D11 and the capacitor C11 will memorize the maximum peak potential. However, the capacitor C11 will continue to discharge through the resistor R12 and the terminal potential of the capacitor C11 drops in time to provide the fall off slope of the curve already noted in FIG. 14.

The target torque will be modified if a helper applies a force to the handgrip 38. Its potentiometer 109 will be added to this. The time during which the assist power $F_a$ is left applied can be adjusted by setting the capacity of the capacitor C12 and the value of the resistor R12. In a preferred embodiment, this time is adjustable between 2 and 5 seconds. When, however, a reverse force is applied at the hand wheel 67 thus actuating the potentiometer 103 in the negative direction, there will be a subtraction effect cause through the operation of the diode D21, capacitor D21 and resistors R21 and R22 which is subtracted from the previously held value of the capacitor C1.

The reversing adder OP1 adds linearly the potentials of the capacitors C11 and C21 with resistors R12 and R22 and the assist ratio in the advancing direction is determined by the input resistors R12 and R13 while the assist ratio in the reversing direction is determined by the input capacitors R22 and R13. Thus, by changing the values of the various resistors and capacitors, the desired action may be achieved and adjusted. By changing the value of the resistor 32, the amount of operator or helper assist can be varied, as should be readily apparent.

Figure 16:
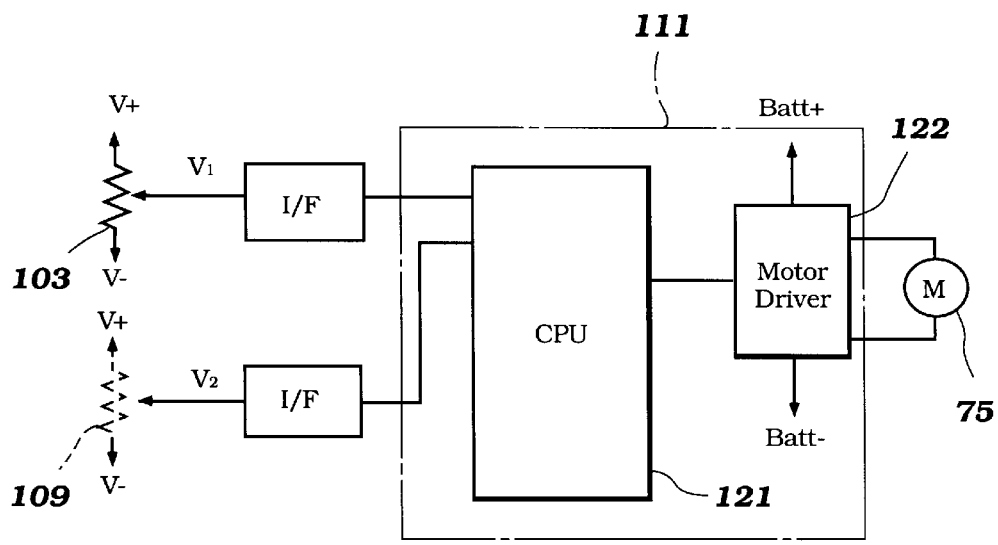
FIG. 16 is an electrical diagram, in part similar to FIG. 11, and shows another embodiment of the invention.
Figure 17:
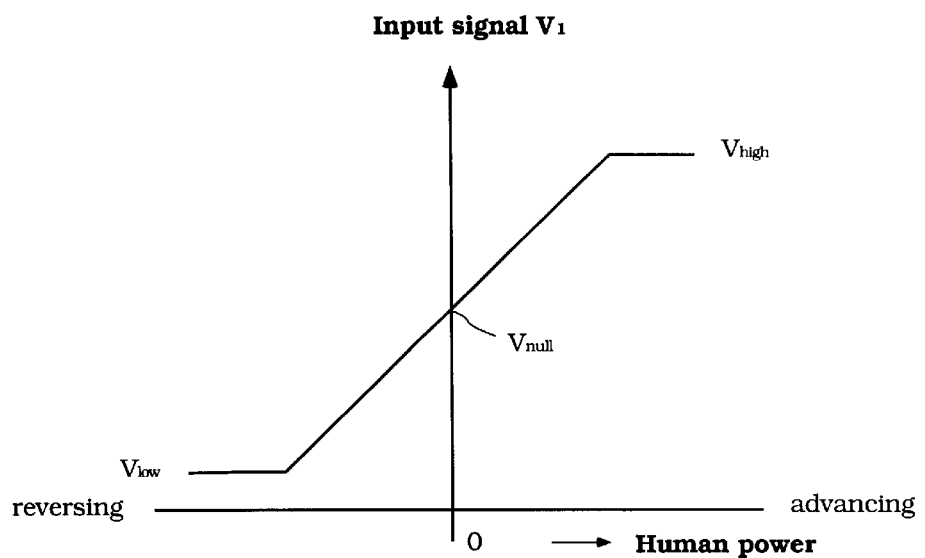
FIG. 17 is a graphical view showing the output signal of the sensor in conjunction with this embodiment.
Figure 18:
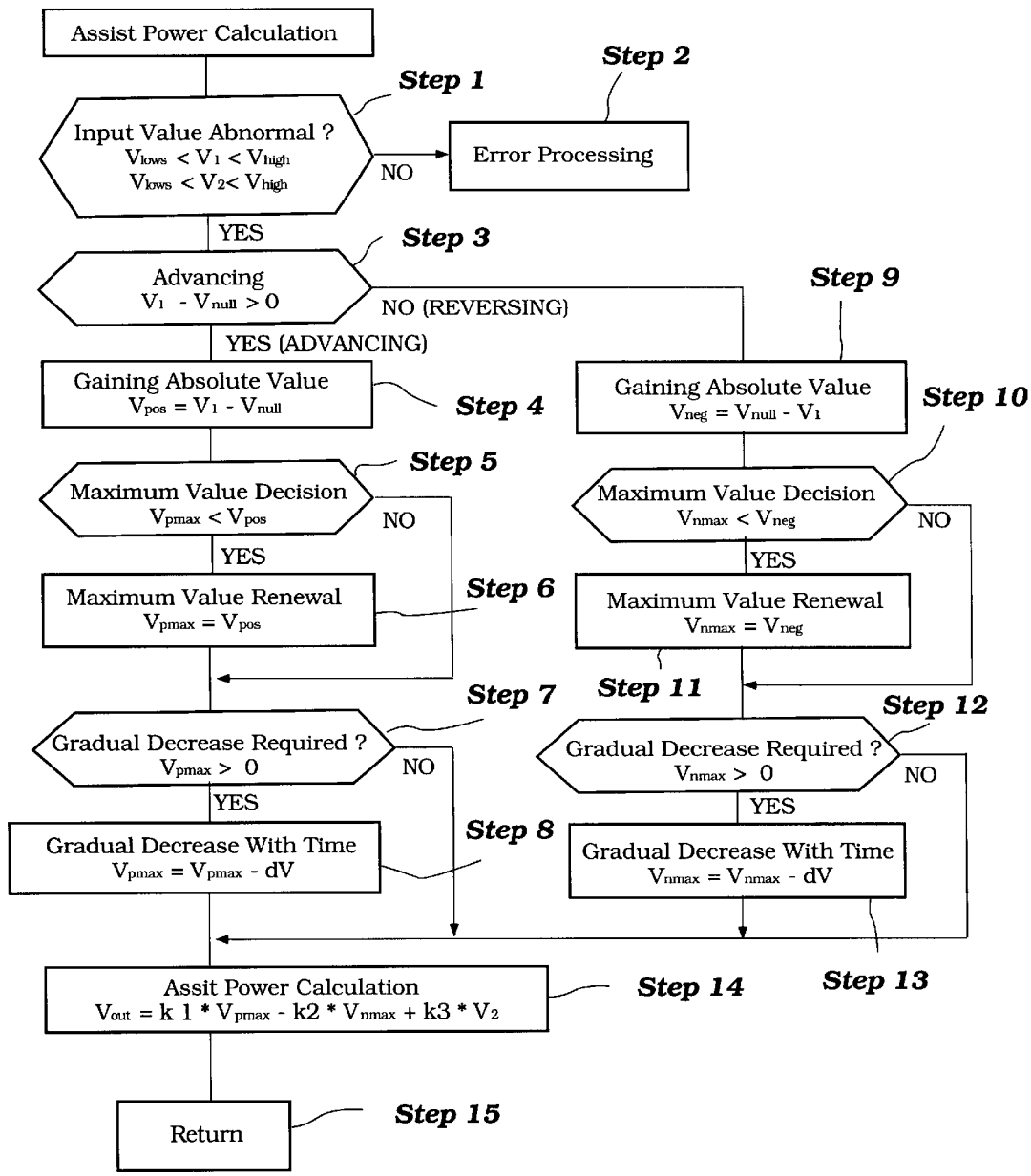
FIG. 18 is a block diagram showing the control routine in accordance with this embodiment.

FIGS. 16–18 show another embodiment of the invention wherein the same type of decay curve in power assist may be obtained through the use of an ECU or CPU, indicated generally by the reference numeral 121 and which forms a part of the controller 111. The ECU 121 controls a motor driver circuit 122 that outputs its control signal to the electric motor 75.

In this instance, the outputs from the potentiometers 103 and 109 are transmitted through interface circuits I/F to the CPU 121. The CPU 121 operates in accordance with a control routine as shown in FIG. 18. In this system, the input signal V from the potentiometers 103 and 109 are shown in relation to the human power assist. In conjunction with this embodiment, it is not necessary to include a null deadband as shown in the previously described embodiment although this also may be employed, if desired.

Referring specifically to FIG. 18, the control routine begins and moves to the Step 1 to determine if the input value $V_1$ or $V_2$ from the potentiometers 103 and 109 are abnormal. These values are compared with $V_{low}$ and $V_{high}$ which may be set so as to indicate the lowest and highest values anticipated by the circuit. If one or the other of the outputs $V_1$ or $V_2$ of the potentiometers 103 and 109 fall outside of this range, the program moves to an error processing step, Step 2, and assist control is discontinued.

However, assuming the output values are within the normal range, then the program moves to Step 3 to determine if the wheelchair 31 is being propelled in a forward or a reverse direction. This is determined by checking the output of the potentiometer 103 associated with the wheel with $V_{null}$ which is generally a value slightly greater than zero. $V_{null}$ is set slightly greater than zero so as to achieve some tolerance in the system. If $V_1 - V_{null} > 0$, then it is assumed that the wheelchair 31 is being moved forwardly while if it is less it is assumed that it is being reversed.

Assuming forward motion, then the program moves to Step 4 so as to set a absolute force input signal $V_{pos}$ which is equal to the measured value of $V_1$ less $V_{null}$ ($V_{pos} = V_1 - V_{null}$). The program then moves to Step S5 to determine if the absolute value of manual input power VPOS is greater than the previously memorized $V_{pmx}$. If it is not, the program jumps to Step S7. If, however, at Step S5 it is determined that the actual manual power input as sensed by the potentiometer 103 is greater than the previously set value $V_{pow} > V_{pmx}$, then the program moves to the step S6 to set a new maximum value manual power ($V_{pmx} = V_{pos}$).

The program then moves to the step S7 to determine if a gradual decrease in power assist is required because of the fact that the output signal of the potentiometer 103 is not increasing. The program then checks to see if $V_{pmax}$ is greater than zero. If it is not, then no decrease in power assist is required because the system will be operating in the null range and the program jumps ahead.

If, however, $V_{pmax}$ is equal to or greater than zero then the program gradually decreases $V_{pmax}$ in accordance with the following equation:

$$V_{pmax} = V_{pmax} - dV$$

The value for dV chosen determines the rate at which the decrease curve will be sloped and this can vary in relation to a number of factors as aforenoted.

Reverting now back to Step S3, if the force $V_1$ is not advancing over the previous value, then it is assumed that there is a reversing operation being caused and the program moves to Step S9 so as to determine if a new value for Vneg in accordance with the formal of Vneg=Vnull−V1. Having reached this new absolute velocity for the negative assist, the program moves to Step S10 to determine if the absolute value is increasing to determine if $V_{nmax}$ is less than or equal to $V_{neg}$. If not, the program jumps to Step S12. If, however, $V_{neg}$ is greater than $V_{nmax}$, then a new maximum negative boost $V_{nmax}$ is established where $V_{nmax} = V_{neg}$.

The program then moves to the step S12 to again determine if a gradual decrease in reverse boost is required. If so, the program checks to see if $V_{nmax}$ is greater than zero and if it is not it is assumed that no reduction is required because the null range will have been reached and the program jumps ahead.

If, however, at Step S12 it has been determined that $V_{nmax}$ is greater than zero then $V_{nmax}$ is reduced in accordance with the following equation:

$$V_{nmax} = V_{nmax} - dV$$

As noted above, the value of dV may be the same on positive or forward movement or may be different.

Having thus completed the calculations for the values, the program then moves to the step S14 to actually determine the assist-power calculation in accordance with the following equation:

$$V_{out} = 1 \times V_{pmax} - k2 \times V_{nmx} + k3 \times V_2$$

In the foregoing equation, the values of k1, k2, and k3 are constants or variable coefficients and $V_2$ is the output from the manual assist potentiometer 109.

Figure 19:
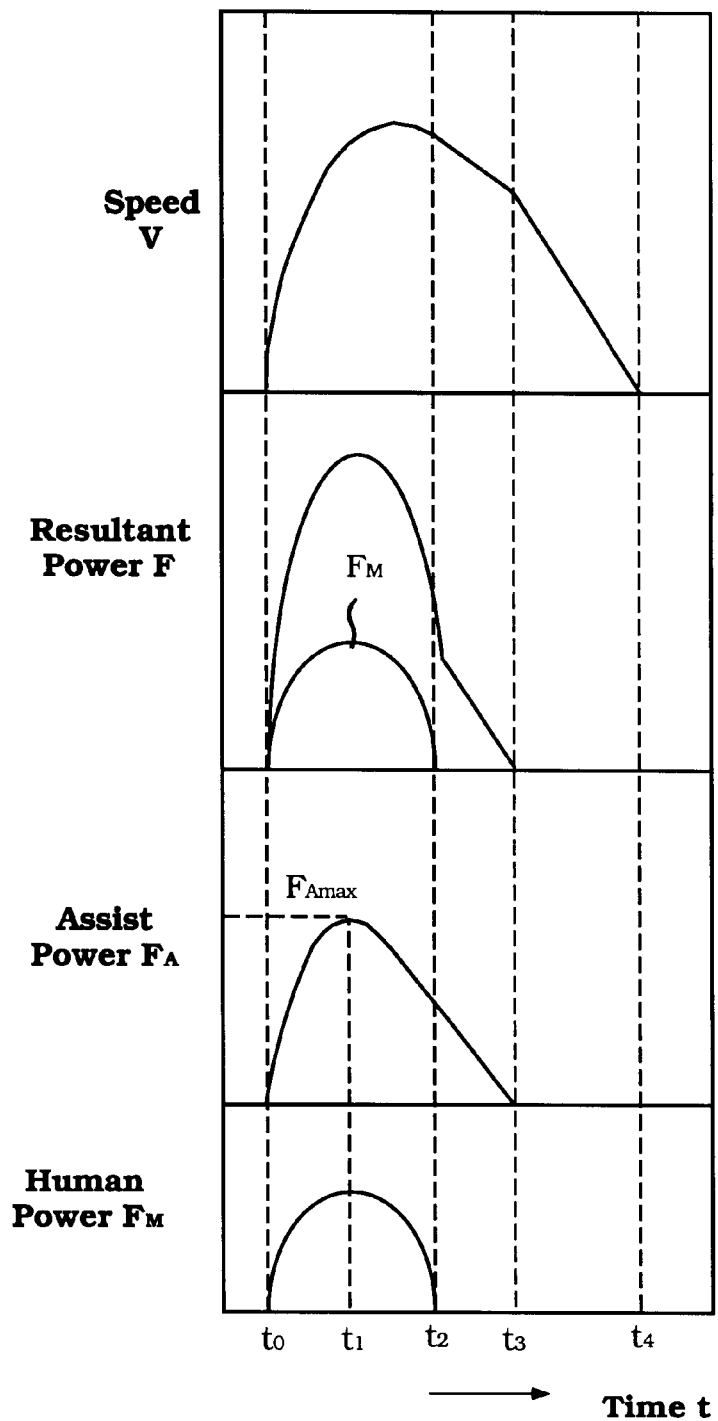
FIG. 19 is a graphical view showing vehicle speed, human power input, assist power, and total power in accordance with this embodiment.

This program continues on and repeats with time at selected time intervals and this results in the performance characteristics shown in FIG. 19. It can be seen that as the power input from the operator increases from the time $t_0$ to $t_1$, the assist power $F_A$ increases from 0 to $F_{Amax}$. The resulting total power applied to the wheel is shown in the resultant power curve F and the wheelchair speed will be as shown in the speed curve V.

Once the human power $F_m$ reaches a maximum, then the power assist $V_{nmax}$ will be gradually decreased along a slope beginning at the time t1 and continuing until the time t3 after manual force application has been stopped at the time t2. Hence, it will seen that the vehicle speed will decay in accordance with the curve shown at the top of this figure. The vehicle will continue to travel even after power assist has been discontinued assuming that no new manual force is input up until the point of time t4. This delay is determined by the friction, wind resistance and other factors.

Figure 20:
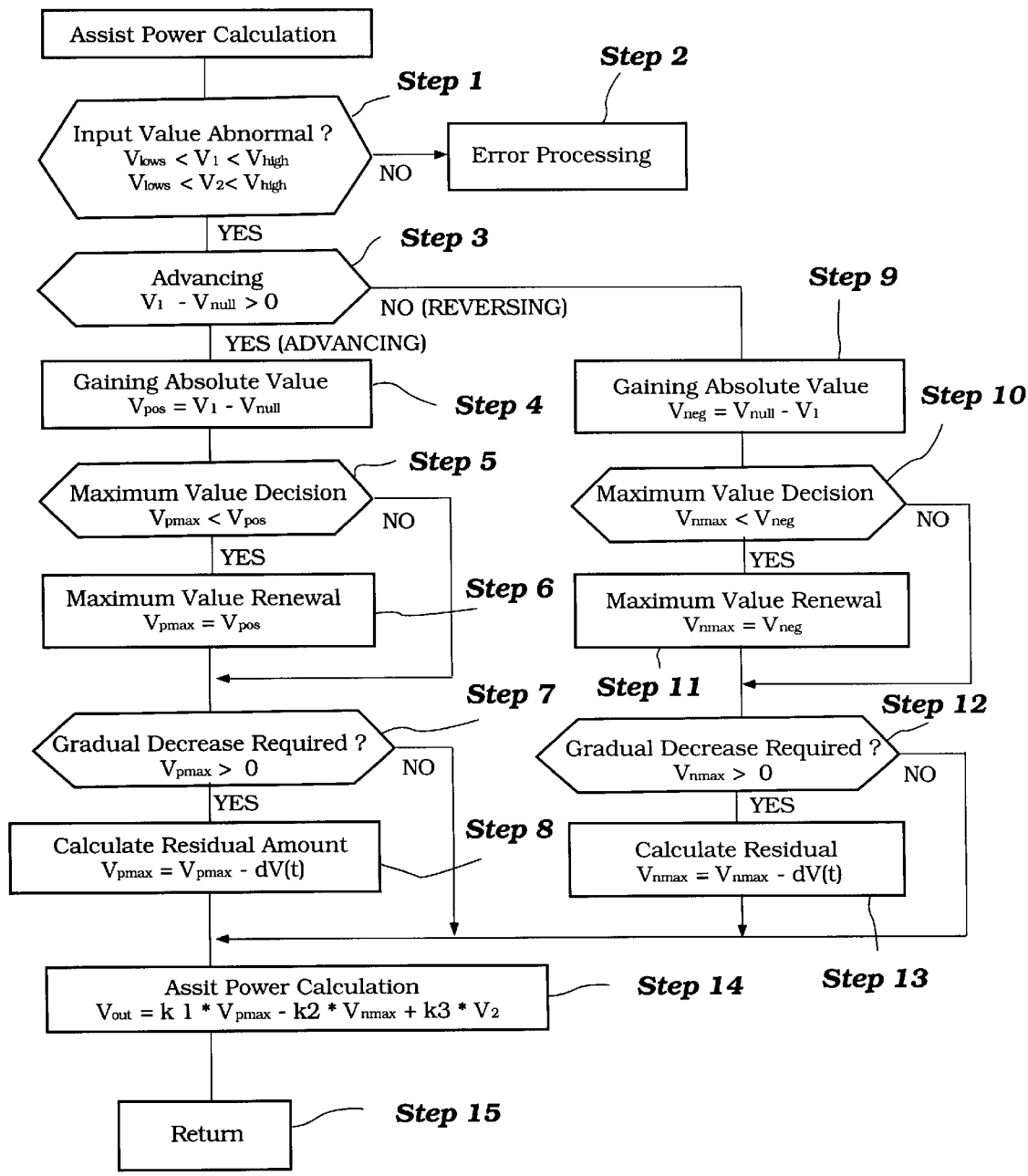
FIG. 20 is a block diagram, in part similar to FIG. 18, and shows another control routine.

In the foregoing example, the decrease in power assist has been generally linear and has been decreased by fixed increments of power assist changing in fixed time intervals. It is possible, however, to also vary the power assist in accordance with a variable time interval by substituting dV(t) for dV in the previously described embodiment. Except for this difference, the FIG. 20 illustrates an embodiment which is the same as in FIG. 19 and, for that reason, further description of this figure is not believed to be necessary. That is, the embodiment operated in accordance with this figure differs from the previously described embodiment only in the amount of power assist decrease is varied with time rather than held constant and decreased in uniform increments.

Figure 21:
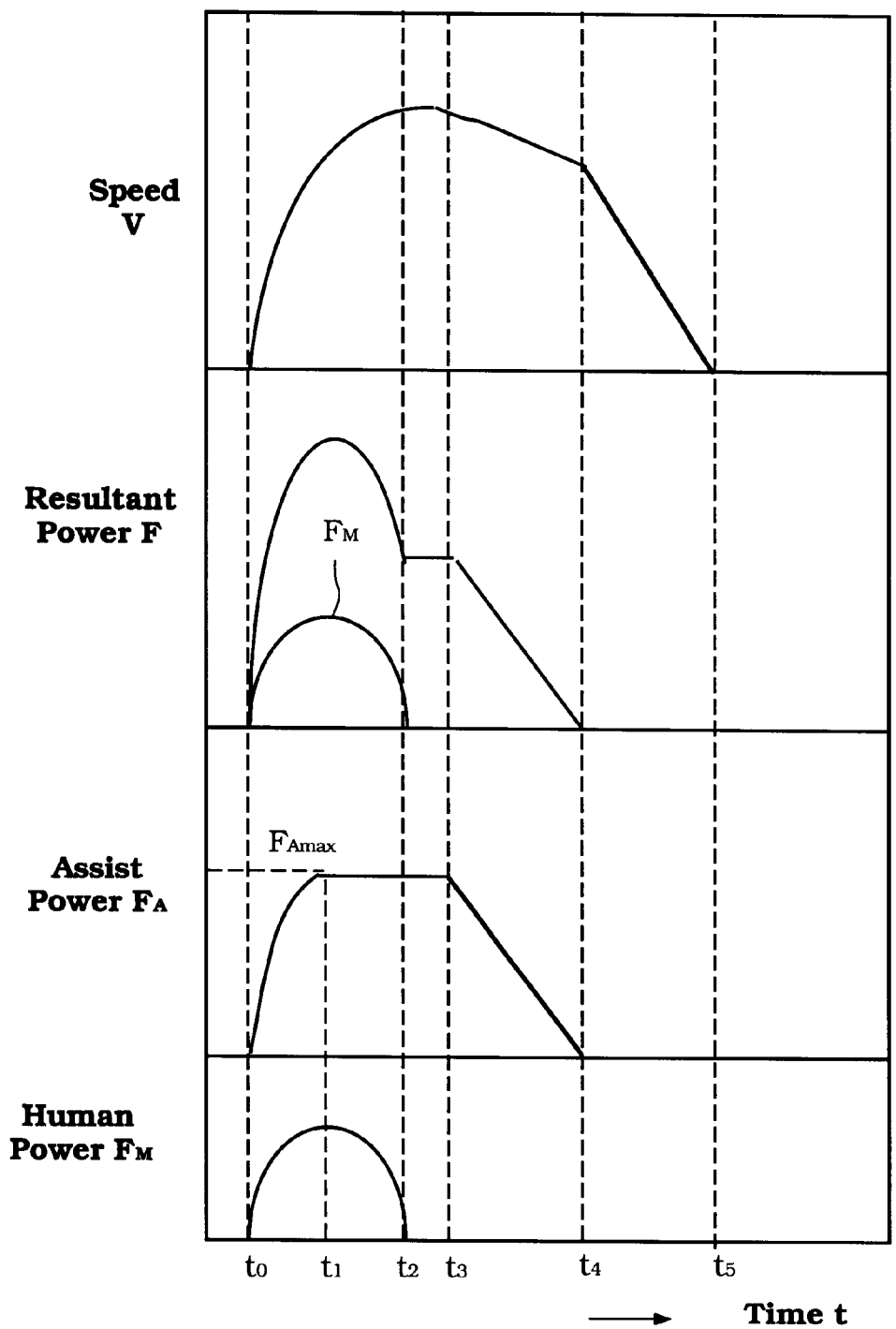
FIG. 21 is a graphical view, in part similar to FIG. 19 showing the same characteristics in accordance with this embodiment.

The variation in time method of FIG. 20 can be done in a variety of ways and FIG. 21 is a family of curves similar to FIG. 19 and shows a relationship where the assist is maintained at the maximum assist ratio for a time period after maximum manual force is input and then decreased uniformly. Thus, for the time period t1 when maximum manual power is inputted until the time period t3, some fixed interval thereafter, the assist power is maintained constant.

After this fixed time interval t1–t3 has elapsed, then the value of V is decreased in accordance with a fixed amount in a fixed time as shown in FIG. 21. This type of arrangement is particularly useful for example in going up a grade because it permits the use of smaller manual input under these conditions.

Figure 22:
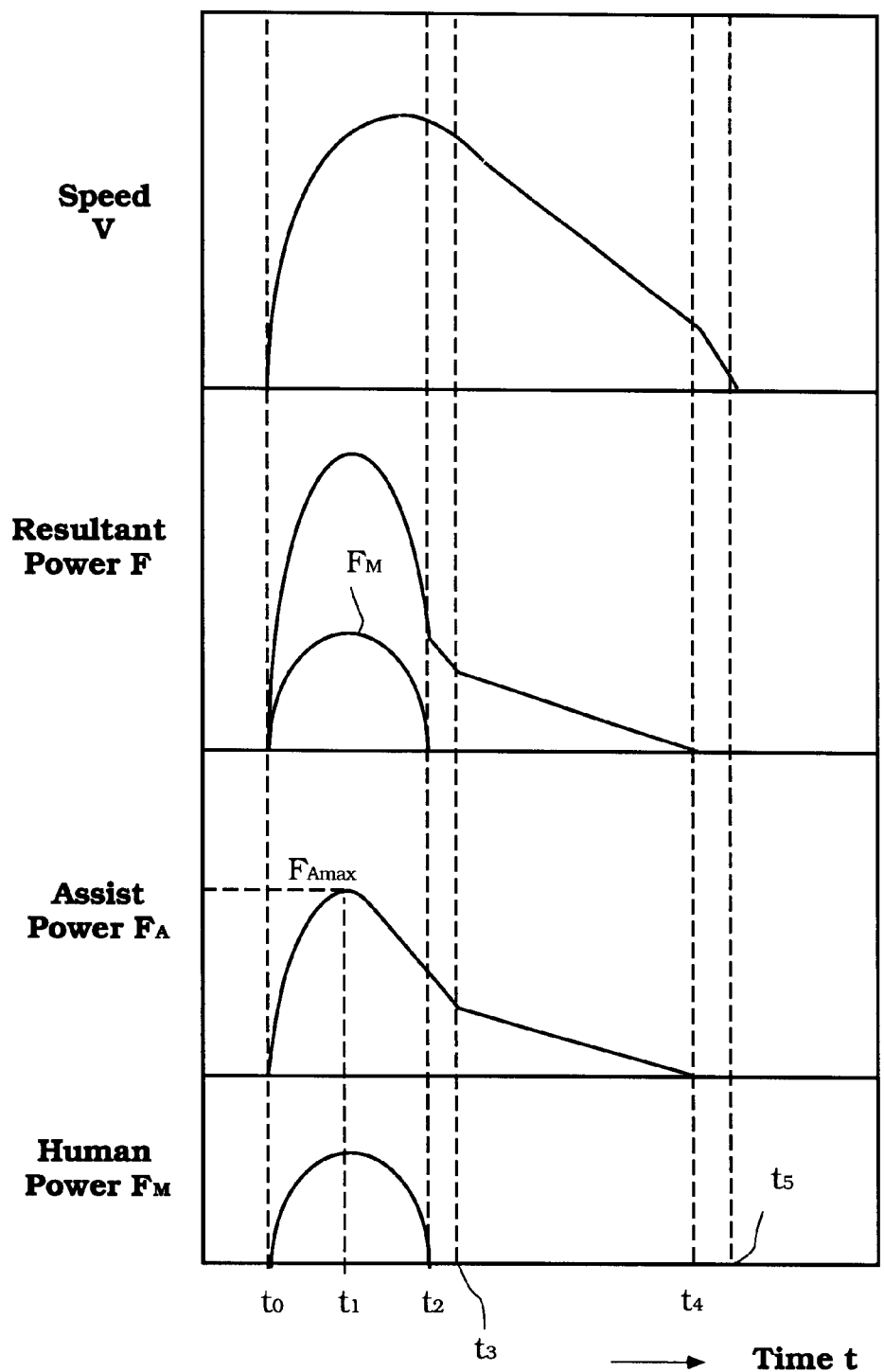
FIG. 22 is a graphical view, in part similar to FIG. 19 and 21, and shows another embodiment of the invention.

FIG. 22 shows another control routine which operates on this same general principle but in this embodiment the amount of decrease of power assist during a first time interval t1 to t3 after maximum manual power is input is decreased at a first, somewhat steeper slope. Thereafter for the time period t3 to t4 the power assist dV is decreased in uniform increments but at a slower rate. This gradual reduction rate of power assist, which occurs approximately at the time when the operator ceases to put in manual force gives a feeling closer to that of a manual wheelchair and operation becomes easier and simpler. Again, the speed will gradually deteriorate after the power assist and the wheelchair will actually stop at the time t5 which, in accordance with this control range is fairly soon after the time period t4.

In addition to the two-phase reduction as shown in FIG. 22, it should also be understood that various other stepped reductions in power assist can be employed starting at varying time intervals, for example, at the time when the maximum manual power is exerted.

Figure 23:
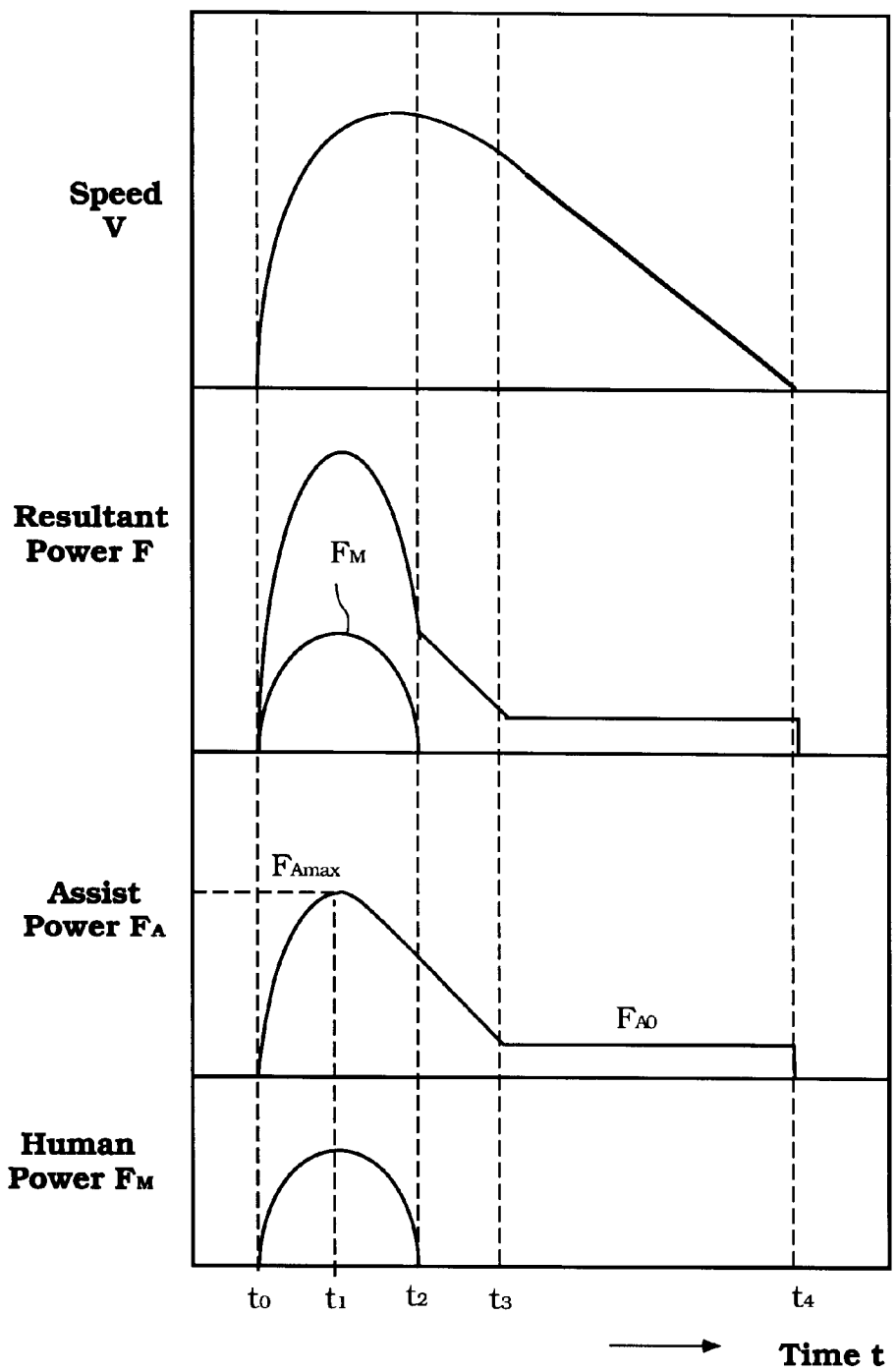
FIG. 23 is a graphical view, in part similar to FIGS. 19, 21, and 22 and shows a still further embodiment of the invention.

FIG. 23 shows another power assist arrangement wherein the power assist is gradually varied from the time point $t_1$ to the time $t_3$ along a fixed ratio. Then, the power assist is maintained approximately equal to $F_{A_O}$ to a time period t4 when the wheelchair actually will stop. The value $F\lambda_O$ of assist power is maintained approximately constant is an amount commensurate with the reverse drive of the assist device and a current commensurate with the amount flowing through the motor. Of course, assist power $F_A$ may be gradually reduced along a curve or the value $F_{AO}$ may be changed with a small gradient. This also provides a coasting feeling similar to that of when no power assist is applied at all. This also preserves the expenditure of energy and extends the range of the wheelchair.

Figure 24:
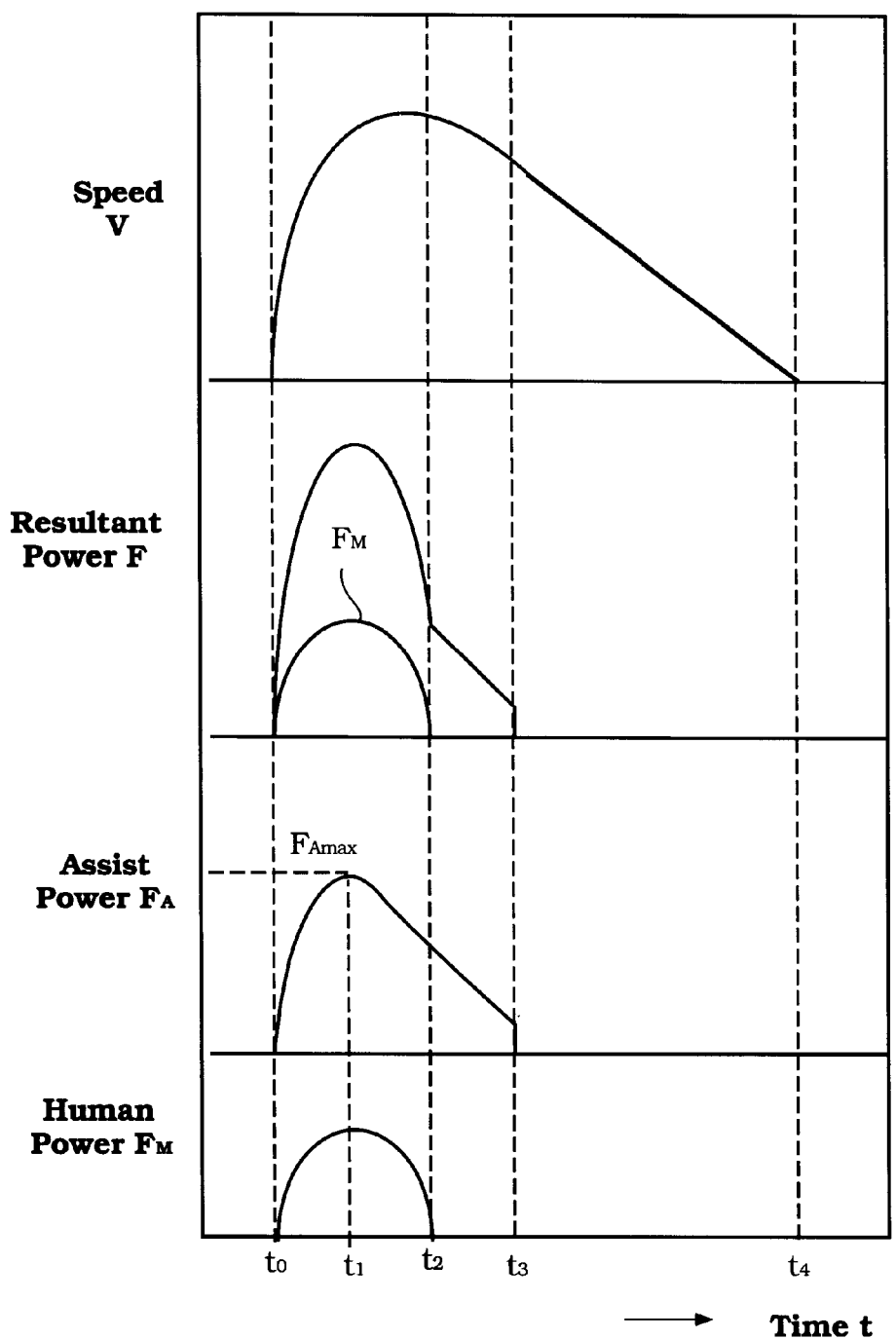
FIG. 24 is a graphical view, in part similar to FIGS. 18, 21, 22, and 23 and shows yet another embodiment of the invention.
Figure 25:
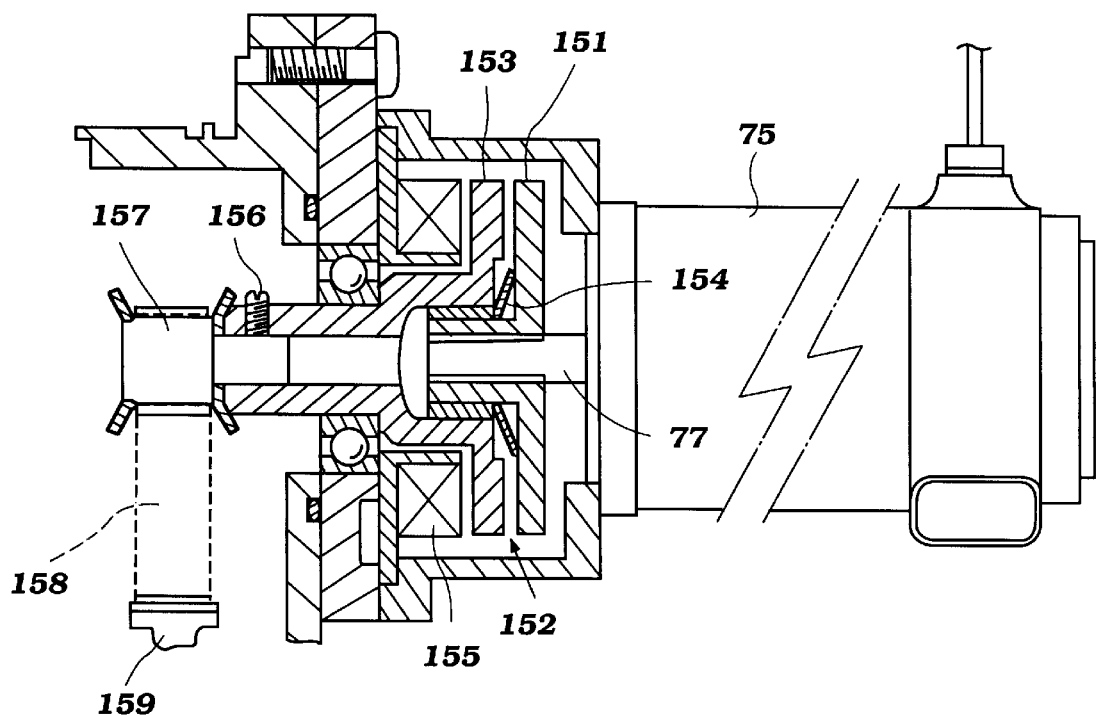
FIG. 25 is an enlarged cross-sectional view showing the clutch mechanism in accordance with yet another embodiment of the invention.

FIG. 24 shows another assist curve which is achieved for a time period and then not only shutting off the power assist but also disconnecting a clutch in the drive. In this way, EMF back braking of the motor is avoided. This drive also varies from that previously disclosed in that the gear train is replaced by a mechanism as shown in FIG. 25. In this embodiment, the motor armature shaft 77 drives a driving disk 151 of an electromagnetic clutch, indicated generally by the reference numeral 152. This driving disk 151 has a splined connection to the armature shaft 77 and is urged axially away from a driven disk 153 by a Belville-type spring 154 interposed therebetween. An electrical armature 155 is disposed on the other side of the driven clutch 153 and when energized will attract the driving disk 151 into frictional engagement with the driven disk 153 to drive it.

The driven disk 153 is connected by a pin or a screw 156 to a driving pulley 157. The pulley 157 drives a belt 158 which is, in turn, engaged with a larger pulley 159 that is affixed for rotation with the wheel 63 and thus drives it with a major speed reduction.

This system operates in a manner which will be described by reference to both FIGS. 24 and 25 in that the clutch 152 is engaged as soon as manual power is applied and the electric motor 175 is operated to provide an assist power that varies in accordance with a predetermined slope up until maximum manual power is applied. At this time, the assist curve is varied from the time period t1 to the time period t3 in any of the manners previously described, a linear variation being shown. At this time, the actual power assist will be discontinued and the clutch 152 is disengaged so there will be no EMF braking and the wheelchair will gradually slow to a halt.

It is believed that the various embodiments described will suggest to those skilled in the art still other ways in which the power assist may be varied during the shutdown phase so as to provide the desired performance. Of course, with each embodiment, electric power assist is maintained after the manual power input is decreased. The foregoing descriptions are that of preferred embodiments and various modifications, including those mentioned, may be made without departing from the spirit and scope of the invention, as defined by the appended claims.

What is claimed is:

1. A power-assisted, manually-operated vehicle having a manual operator for receiving a manual force for propelling the vehicle, a prime mover carried by said vehicle and operative to provide a propulsion force for propelling said vehicle, a control for operating said prime mover, sensing means for sensing the application of a manual force to said manual operator, said control being effective to initiate assist operation of said prime mover upon the output of a signal of a predetermined value from said sensing means in an amount determined by the magnitude of the sensed manual force and gradually reducing the magnitude of the assist operation of said prime mover regardless of the speed of said vehicle upon the sensing of a condition only when no manual force applied to said manual operator.

2. A power-assisted, manually-operated vehicle as set forth in claim 1, wherein the manual operator is operated by an occupant of the vehicle.

3. A power-assisted, manually-operated vehicle as set forth in claim 1, wherein the manual operator is operated by a person that walks behind and pushes the vehicle.

4. A power-assisted, manually-operated vehicle as set forth in claim 3, further including a separate manual operator operated by an occupant of the vehicle.

5. A power-assisted, manually-operated vehicle as set forth in claim 1, wherein the vehicle is a wheeled vehicle.

6. A power-assisted, manually-operated vehicle as set forth in claim 5, wherein the vehicle comprises a wheelchair.

7. A power-assisted, manually-operated vehicle as set forth in claim 6, wherein at least one of the wheelchair wheels is provided with a hand wheel which comprises the manual operator.

8. A power-assisted, manually-operated vehicle as set forth in claim 7, wherein the sensing means comprises means providing a connection between the hand wheel and the vehicle wheel and for sensing relative movement therebetween.

9. A power-assisted, manually-operated vehicle as set forth in claim 7, wherein the effective operation of the prime mover is gradually reduced only when no manual force is input.

10. A power-assisted, manually-operated vehicle as set forth in claim 7, wherein the effective operation of the prime mover is held constant for a time period before the gradual reduction.

11. A power-assisted, manually-operated vehicle as set forth in claim 10, wherein the effective operation of the prime mover is held at its maximum value until the predetermined time period.

12. A power-assisted, manually-operated vehicle as set forth in claim 5, wherein there are a pair of wheels each driven by a prime mover and each having a respective manual operator.

13. A power-assisted, manually-operated vehicle as set forth in claim 12, wherein the control means operates the prime mover to provide an output that is varied in response to the amount of manual force sensed by the sensing means.

14. A power-assisted, manually-operated vehicle as set forth in claim 6, wherein the wheelchair further includes means for permitting a helper to push the wheelchair and means for sensing the manual force exerted by the helper and providing an input to the control.

15. A power-assisted, manually-operated vehicle as set forth in claim 14, wherein there are a pair of wheels each driven by a prime mover and each having a respective manual operator.

16. A power-assisted, manually-operated vehicle as set forth in claim 15, wherein the wheelchair comprises a frame having a pair of side frame elements each rotatably journaling a respective wheel and wherein the primer movers comprise a pair of electric motors each having armature shafts rotatable about axes that extend parallel to the wheel axes and which drive the respective wheel through respective transmissions, and linkage means interconnecting said side frames for folding movement between an open spaced apart position and a closed stored position wherein said front side frames are disposed closely adjacent each other and without removing said electric motors from said frame element.

17. A power-assisted, manually-operated vehicle as set forth in claim 16, wherein the axes of the armature shafts are offset from each other so as to permit the electric motors to nest one on the side of the other when the side frames are folded into their carrying position.

18. A power-assisted, manually-operated vehicle having a manual operator for receiving a manual force for propelling the vehicle, a prime mover carried by said vehicle and operative to provide a propulsion force for propelling said vehicle, a control for operating said prime mover, sensing means for sensing the application of a manual force to said manual operator, said control being effective to initiate operation of said prime mover upon the output of a signal of a predetermined value from said sensing means and gradually reducing the effective operation of said prime mover upon the sensing of a reduction in the manual force applied to said manual operator regardless of the speed of travel of said vehicle, the effective operation of said prime mover being held constant for a time period before the gradual reduction is initiated.

19. A power-assisted, manually-operated vehicle as set forth in claim 18, wherein the effective operation of the prime mover is held at its maximum value until the predetermined time period.

20. A power-assisted, manually-operated vehicle having a manual operator for receiving a manual force for propelling the vehicle, a prime mover carried by said vehicle and operative to provide a propulsion force for propelling said vehicle, a control for operating said prime mover, sensing means for sensing the application of a manual force to said manual operator, said control being effective to initiate operation of said prime mover upon the output of a signal of a predetermined value from said sensing means and gradually reducing the effective operation of said prime mover regardless of the speed of said vehicle upon the sensing of a reduction in the manual force applied to said manual operator, the gradual reduction occurring only after a preset maximum manual force has been applied and that preset maximum manual force is then reduced.

21. A power-assisted, manually-operated vehicle having a manual operator for receiving a manual force for propelling the vehicle, a prime mover carried by said vehicle and operative to provide a propulsion force for propelling said vehicle, a control for operating said prime mover, sensing means for sensing the application of a manual force to said manual operator, said control being effective to initiate assist operation of said prime mover upon the output of a signal of a predetermined value from said sensing means in an amount determined by the magnitude of the sensed manual force and maintaining the assist operation of said prime mover for a period of time after the sensing of a reduction in the manual force applied to said manual operator regardless of the speed of said vehicle.

22. A power-assisted, manually-operated vehicle as set forth in claim 21, wherein the control maintains a uniform power assist for a predetermined time period after the reduction in the manual force applied to the manual operator as sensed and then gradually reduces the power assist.

23. A power-assisted, manually-operated vehicle as set forth in claim 22, wherein the operation of the prime mover is gradually reduced during the predetermined time period.

24. A power-assisted, manually-operated vehicle as set forth in claim 23, wherein the operation of the prime mover is gradually reduced after a second predetermined time period.

25. A power-assisted, manually-operated vehicle as set forth in claim 21, wherein the manual operator is operated by an occupant of the vehicle.

26. A power-assisted, manually-operated vehicle as set forth in claim 25, wherein the vehicle is a wheeled vehicle.

27. A power-assisted, manually-operated vehicle as set forth in claim 25, wherein the vehicle comprises a wheelchair.

28. A power-assisted, manually-operated vehicle as set forth in claim 27, wherein at least one of the wheelchair wheels is provided with a hand wheel which comprises the manual operator.

29. A power-assisted, manually-operated vehicle as set forth in claim 25, wherein there are a pair of wheels each driven by a prime mover and each having a respective manual operator.

30. A power-assisted, manually-operated vehicle as set forth in claim 29, wherein the wheelchair comprises a frame having a pair of side frame elements each rotatably journaling a respective wheel and wherein the primer movers comprise a pair of electric motors each having armature shafts rotatable about axes that extend parallel to the wheel axes and which drive the respective wheel through respective transmissions, and linkage means interconnecting said side frames for folding movement between an open spaced apart position and a closed stored position wherein said front side frames are disposed closely adjacent each other and without removing said electric motors from said side frame elements.

31. A power-assisted, manually-operated vehicle as set forth in claim 30, wherein the axes of the armature shafts are offset from each other so as to permit the electric motors to nest one-on the side of the other when the side frames are folded into their carrying position.

* * * * *